(12) United States Patent
Chen

(10) Patent No.: US 11,018,793 B2
(45) Date of Patent: May 25, 2021

(54) NETWORK OPTIMISATION

(71) Applicant: Nokia Technologies Oy, Espoo (FI)

(72) Inventor: Chung Shue Chen, Nozay (FR)

(73) Assignee: Nokia Technologies Oy, Espoo (FI)

( * ) Notice: Subject to any disclaimer, the term of this patent is extended or adjusted under 35 U.S.C. 154(b) by 52 days.

(21) Appl. No.: 16/626,025

(22) PCT Filed: Jul. 4, 2017

(86) PCT No.: PCT/EP2017/066663
§ 371 (c)(1),
(2) Date: Dec. 23, 2019

(87) PCT Pub. No.: WO2019/007487
PCT Pub. Date: Jan. 10, 2019

(65) Prior Publication Data
US 2020/0127753 A1    Apr. 23, 2020

(51) Int. Cl.
| | |
|---|---|
| *H04W 4/00* | (2018.01) |
| *H04J 11/00* | (2006.01) |
| *H04L 5/00* | (2006.01) |
| *H04W 24/02* | (2009.01) |
| *H04W 28/18* | (2009.01) |
| *H04W 72/04* | (2009.01) |
| *H04W 72/08* | (2009.01) |

(52) U.S. Cl.
CPC .......... *H04J 11/005* (2013.01); *H04L 5/0073* (2013.01); *H04W 24/02* (2013.01); *H04W 28/18* (2013.01); *H04W 72/0406* (2013.01); *H04W 72/082* (2013.01)

(58) Field of Classification Search
CPC ..... H04J 11/005; H04L 5/0073; H04W 24/02; H04W 72/082; H04W 72/0406; H04W 28/18
USPC ................. 370/329–330, 335–345, 347–348
See application file for complete search history.

(56) References Cited

U.S. PATENT DOCUMENTS

| | | | | |
|---|---|---|---|---|
| 7,539,495 B2 * | 5/2009 | Kalika | ............... | H04N 21/4126 455/446 |
| 8,072,945 B2 * | 12/2011 | Sherman | ............... | H04W 24/04 370/338 |
| 8,644,141 B2 * | 2/2014 | Gao | ...................... | H04W 24/02 370/229 |
| 2013/0203398 A1 | 8/2013 | Callard et al. | ................ | 455/418 |
| 2015/0063222 A1 | 3/2015 | Wang et al. | .................. | 370/329 |

(Continued)

*Primary Examiner* — Thai D Hoang
(74) *Attorney, Agent, or Firm* — Harrington & Smith

(57) ABSTRACT

A method of optimising a network includes selecting an operating characteristic of a network to optimise; determining at least one operating parameter of network nodes within the network which affects the operating characteristic; selecting an optimisable network node from within the network; identifying a cluster of the network nodes whose operating characteristic is affected by a change in the at least one operating parameter of the optimisable network node; iteratively adjusting the at least one operating parameter of the optimisable network node; determining the operating characteristic of the cluster of the network nodes in response to that adjusted at least one operating parameter of the optimisable network node; and selecting that adjusted at least one operating parameter of the optimisable network node which improves the operating characteristic of the cluster of the network nodes.

19 Claims, 8 Drawing Sheets

(56) References Cited

U.S. PATENT DOCUMENTS

| | | |
|---|---|---|
| 2015/0131537 A1 | 5/2015 | Chiang et al. |
| 2015/0195136 A1* | 7/2015 | Mermoud ............... G06N 20/00 706/12 |
| 2015/0257147 A1* | 9/2015 | Ji .......................... H04W 92/20 370/329 |
| 2016/0150460 A1* | 5/2016 | Leroux ................. H04W 24/08 370/329 |
| 2016/0156425 A1* | 6/2016 | Katayama ............ H04B 17/345 455/67.13 |
| 2016/0165462 A1 | 6/2016 | Tan et al. |
| 2017/0026915 A1 | 1/2017 | Madan et al. |

* cited by examiner

| ABS Ratio | ABS Pattern | | | | | | | | | |
|---|---|---|---|---|---|---|---|---|---|---|
| 0% | 0 | 1 | 2 | 3 | 4 | 5 | 6 | 7 | 8 | 9 |
| 10% | ▨ | 1 | 2 | 3 | 4 | 5 | 6 | 7 | 8 | 9 |
| 20% | ▨ | 1 | 2 | 3 | 4 | ▨ | 6 | 7 | 8 | 9 |
| 30% | ▨ | 1 | ▨ | 3 | 4 | ▨ | 6 | 7 | 8 | 9 |
| 40% | ▨ | 1 | ▨ | 3 | 4 | ▨ | ▨ | 7 | 8 | 9 |
| 50% | ▨ | 1 | ▨ | 3 | ▨ | ▨ | 6 | ▨ | 8 | 9 |
| 60% | ▨ | 1 | ▨ | 3 | ▨ | ▨ | 6 | ▨ | 8 | ▨ |

□ non-ABS
▨ ABS

NETWORK OPTIMISATION

CROSS REFERENCE TO RELATED APPLICATION

This patent application is a U.S. National Stage application of International Patent Application Number PCT/EP2017/066663 filed Jul. 4, 2017, which is hereby incorporated by reference in its entirety.

FIELD OF THE INVENTION

The present invention relates to a method of optimising a network, a network node and a computer program product.

BACKGROUND

Networks, such as wireless telecommunications networks, are known. According to an estimate of the growth of mobile data volume, more capacity must be added to current cellular networks. Cell densification, due to its ability of reusing spectrum geographically and its property of preserving signal-to-interference-plus-noise ratio (SINR), serves as a promising candidate solution to meet the demand of mobile users. Contrary to traditional cell densification where more high-power base stations (BSs) are added, it is more practical to add low-power BSs due to the high cost of installing macro BSs and the shortage of available sites suitable for macro BSs, which gives rise of the development of heterogeneous networks (HetNets).

The emergence of HetNets gives rise to two challenging network management problems. First, because pico BSs transmit at low power levels compared to macro BSs, mobile users who are physically located near pico BSs may be attracted to macro BSs, which can create underutilized pico BSs and overcrowded macro BSs. Therefore, in order to fully utilize the available resources in BSs with different transmission power, careful treatment is needed when performing user association. Second, the surrounding macro BSs of a pico BS can generate large interference to a user associated to the pico BS, and such inter-cell interference must be well-managed in order to prevent pico BSs' users from suffering very low downlink throughputs.

It is desired to provide techniques to improve the optimisation of such networks.

SUMMARY

According to a first aspect, there is provided a method of optimising a network, comprising: selecting an operating characteristic of a network to optimise; determining at least one operating parameter of network nodes within the network which affects the operating characteristic; selecting an optimisable network node from within the network; identifying a cluster of the network nodes whose operating characteristic is affected by a change in the at least one operating parameter of the optimisable network node; iteratively adjusting the at least one operating parameter of the optimisable network node; determining the operating characteristic of the cluster of the network nodes in response to that adjusted at least one operating parameter of the optimisable network node; and selecting that adjusted at least one operating parameter of the optimisable network node which improves the operating characteristic of the cluster of the network nodes.

The first aspect recognises that a problem with optimizing networks is that it is difficult to ensure that changing parameters of the network will cause a change in the operating characteristic or performance of the network in a manner that converges, rather than diverges or oscillates. That is to say, it is difficult to change an operating parameter of the network in a way that leads to stability in the network. Accordingly, a method is provided. The method may be performed by a network node of the network such as, for example, a wireless telecommunications network. The method may comprise selecting or choosing an operating or performance characteristic of the network which is to be optimized, changed or improved. The method may comprise determining or identifying one or more operating parameters of network nodes which are within or part of the network which affect or change that operating characteristic. For example, an operating characteristic may be throughput of the network and an operating parameter which affects that throughput may be a transmission power, a bandwidth, an encoding scheme, or the like. The method may comprise selecting a node from within the network to optimize. The method may comprise identifying a cluster or set of network nodes which will be affected by a change in each operating parameter of the network node selected to be optimized. In other words, those network nodes whose operating characteristic is changed by changes in the operating parameters of the network node selected to be optimized may be included in the cluster of network nodes. The method may comprise iteratively or repeatedly adjusting or changing the operating parameter of the network node selected to be optimized. The method may comprise determining, measuring or evaluating the operating characteristic of the cluster following each change to each operating parameter of the network node to be optimized. The method may also comprise selecting or using each adjusted operating parameter which improves or enhances the operating characteristic of the cluster of network nodes. In this way, a distributed approach to network optimization is provided which changes operating parameters of a selected network node and evaluates how that change in operating parameter affects the operating performance of a cluster of network nodes. This provides for optimization on a network-node-by-network-node basis, evaluates the impact of those changes on a cluster-by-cluster basis and helps to ensure that changes in the operating parameters converge.

In one embodiment, the selecting comprises iteratively selecting an optimisable network node from within the network and performing the steps of identifying a cluster, iteratively adjusting and selecting that adjusted at least one operating parameter for each optimisable network node. Accordingly, different network nodes are selected for optimization and the impact of that optimization is assessed on a cluster-by-cluster basis.

In one embodiment, each optimisable network node is selected randomly from the network nodes.

In one embodiment, the operating characteristic is based on inter-cell interference. Accordingly, the operating characteristic may relate to interference between cells.

In one embodiment, the operating characteristic comprises user traffic throughput.

In one embodiment, the cluster comprises network nodes whose inter-cell interference is affected by a change in the at least one operating parameter of the optimisable network node. Hence, when the operating characteristic is inter-cell interference, the cluster may be selected based on those network nodes whose inter-cell interference is affected by changes in the operating parameter of the network node selected to be optimized.

In one embodiment, the cluster comprises the optimisable network node and its neighbouring network nodes.

In one embodiment, the cluster comprises the optimisable network node and those neighbouring network nodes which provide for convergence of the operating parameter. Hence, only those network nodes necessary for stability may be included in the cluster.

In one embodiment, the cluster comprises the optimisable network node and its first-order neighbouring network nodes. It will be appreciated that first-order network nodes may be those whose cell coverage at least partially share the cell coverage of the network node selected to be optimized.

Embodiments recognise that enhanced inter-cell interference coordination (eICIC) has been proposed in Release-10 of the 3GPP LTE standards, where:
1. Cell selection bias (CSB) is used to offset the received signal power from BSs to a user so that a user is not necessarily associated with the BS that provides the strongest received power, and
2. Almost blank subframe (ABS) can be configured in macro BSs so that the macro BSs cease data transmissions in certain time slots, which reduces interference to pico BSs.

The use of ABSs can help reduce the interference from macro BSs to pico BSs. However, the restriction that macro BSs must mute their data transmissions entirely in ABSs may result in the inefficient use of the increasingly scarce resources. In Release-11, further enhanced inter-cell interference coordination (FeICIC) has been proposed, where instead of offering ABSs, macro BSs can configure reduced power almost blank subframes (RP-ABSs) in which the macro BSs can allocate their users and transmit at reduced power levels.

Embodiments also recognise that the configurations of CSB values and ABS patterns in eICIC optimization are coupled because the amount of ABSs depends on the load on pico BSs which depends on CSB values. To achieve the maximum possible performance gain using eICIC, joint optimization in ABS patterns and CSB values is required. Similarly, RP-ABS patterns and CSB values need to be jointly considered when doing FeICIC optimization. While eICIC optimization algorithms have been studied, little attention is paid on the algorithm that performs FeICIC optimization.

In one embodiment, the operating parameter comprises at least one of an almost bank subframe pattern, a cell selection bias and an almost bank subframe reduced power.

Embodiments provide an optimization algorithm that can dynamically adjust the transmission power on each RP-ABS.

Embodiments address the FeICIC optimization problem based on exact potential game models. Embodiments adapt the game theoretic framework so that power control on each time-frequency slot, i.e., physical resource block (PRB), are included during the optimization process. Embodiments provide a rigorous analytical justification of the validity of the proposed method and its generalization. Besides, embodiments provide a downlink scheduler based on a cake-cutting algorithm and compare it against conventional schedulers.

Through simulation studies, it is shown that eICIC optimization can improve the EE of the network by 64% while FeICIC optimization can improve the EE by about 92%. In addition, FeICIC can offer better fairness in users' throughputs and can also yield significant cell-edge throughput gains compared to eICIC.

Embodiments provide a method that is suitable for performing both eICIC and FeICIC optimizations for mobile networks. Based on the exact potential game approach, a scalable distributed algorithm is provided that can either jointly optimize ABS and CSB patterns or jointly optimize RP-ABS and CSB patterns. The game theoretic framework can adapt itself to various system optimization targets, such as proportional fairness (PF) and sum rate maximization.

The performance gain is evaluated due to FeICIC and eICIC optimizations of embodiments. Simulation results show that, compared to the case when no optimization is performed, FeICIC can nearly double the energy efficiency (EE) while eICIC provides about a 64% improvement on EE. Also, FeICIC provides higher fairness in the throughputs of the users and better cell-edge throughputs compared to eICIC.

In one embodiment, the operating parameter comprises at least one of an almost bank subframe pattern, a cell selection bias and an almost bank subframe reduced power in relation to small cells located within a cell provided the optimisable network node. Accordingly, those operating parameters may be the parameters set by the optimizable network node for small cells within its cell coverage area.

In one embodiment, the operating parameter comprises at least one of an almost bank subframe pattern, a cell selection bias and an almost bank subframe reduced power in relation to a selected small cell base station located within a cell provided the optimisable network node. Accordingly, the operating parameter may be varied for a selected small cell provided within each area of the optimizable network node.

In one embodiment, the selected small cell base station is selected randomly from those small cell base stations located within the cell provided the optimisable network node.

Furthermore, it is shown that a cake-cutting algorithm can be used as a downlink scheduler to offer better EE, SE, and fairness among users compared to conventional PF schedulers while being much more computationally efficient than the conventional convex-solvers.

Besides, the downlink scheduler of embodiments is based on a cake-cutting algorithm. Simulation results show that the scheduler can further improve the EE and spectral efficiency (SE) by 10% compared to conventional schedulers, can provide better fairness in SE, and is about 20 times faster than conventional convex algorithms.

In one embodiment, the determining the operating characteristic of the cluster of the network nodes comprises performing scheduling based on that adjusted at least one operating parameter of the optimisable network node to determine the operating characteristic of the cluster of the network nodes with that adjusted at least one operating parameter. Accordingly, scheduling of transmissions may be performed using the adjusted operating parameter and the operating characteristic of the cluster evaluated when operating with that adjusted operating parameter.

In one embodiment, the performing scheduling comprises assuming that network nodes other than the optimisable network node within the cluster transmit with full power while adjusting the at least one operating parameter of the optimisable network node. Accordingly, the scheduling may assume that every other network node within the cluster transmits with full power while the operating parameter is adjusted.

In one embodiment, the scheduler allocates network node resources to users using one of a round-robin, a PF, a convex and a cake-cutting basis.

In one embodiment, the scheduler allocates network node resources to users using a quantisation process whereby iteratively, for each resource, that user which is most-allocated that resource is allocated that resource until all users are allocated at least one resource. The quantisation helps to simplify resource allocation.

In one embodiment, the selecting comprises selecting that adjusted at least one operating parameter of the optimisable network node which most improves the operating characteristic of the cluster of the network. Hence, the adjusted parameter which best improves the operating characteristic may be selected.

In one embodiment, the method comprises ceasing iteratively selecting an optimisable network node from within the network when at least one of: an operating characteristic threshold is exceeded; and less than a threshold change in operating parameters occurs.

According to a second aspect, there is provided a network node, comprising: processing logic operable to select an operating characteristic of a network to optimise, determine at least one operating parameter of network nodes within the network which affects the operating characteristic, select an optimisable network node from within the network, identify a cluster of the network nodes whose operating characteristic is affected by a change in the at least one operating parameter of the optimisable network node, iteratively adjust the at least one operating parameter of the optimisable network node, determine the operating characteristic of the cluster of the network nodes in response to that adjusted at least one operating parameter of the optimisable network node, and select that adjusted at least one operating parameter of the optimisable network node which improves the operating characteristic of the cluster of the network nodes.

In one embodiment, the processing logic is operable to iteratively select an optimisable network node from within the network and identify a cluster, iteratively adjust and select that adjusted at least one operating parameter for each optimisable network node.

In one embodiment, each optimisable network node is selected randomly from the network nodes.

In one embodiment, the operating characteristic is based on inter-cell interference.

In one embodiment, the operating characteristic comprises user traffic throughput.

In one embodiment, the cluster comprises network nodes whose inter-cell interference is affected by a change in the at least one operating parameter of the optimisable network node.

In one embodiment, the cluster comprises the optimisable network node and its neighbouring network nodes.

In one embodiment, the cluster comprises the optimisable network node and those neighbouring network nodes which provide for convergence of the operating parameter.

In one embodiment, the cluster comprises the optimisable network node and its first-order neighbouring network nodes.

In one embodiment, the operational parameter comprises at least one of an almost bank subframe pattern, a cell selection bias and an almost bank subframe reduced power.

In one embodiment, the operational parameter comprises at least one of an almost bank subframe pattern, a cell selection bias and an almost bank subframe reduced power in relation to small cells located within a cell provided the optimisable network node.

In one embodiment, the operational parameter comprises at least one of an almost bank subframe pattern, a cell selection bias and an almost bank subframe reduced power in relation to a selected small cell base station located within a cell provided the optimisable network node.

In one embodiment, the selected small cell base station is selected randomly from those small cell base stations located within the cell provided the optimisable network node.

In one embodiment, the processing logic is operable to determine the operating characteristic of the cluster of the network nodes by performing scheduling based on that adjusted at least one operating parameter of the optimisable network node to determine the operating characteristic of the cluster of the network nodes with that adjusted at least one operating parameter.

In one embodiment, the processing logic is operable to perform scheduling by assuming that network nodes other than the optimisable network node within the cluster transmit with full power while adjusting the at least one parameter of the optimisable network node.

In one embodiment, the scheduling allocates network node resources to users using one of a round-robin, a PF, a convex and a cake-cutting basis.

In one embodiment, the scheduling allocates network node resources to users using a quantisation process whereby iteratively, for each resource, that user which is most-allocated that resource is allocated that resource until all users are allocated at least one resource.

In one embodiment, the processing logic is operable to select that adjusted at least one operating parameter of the optimisable network node which most improves the operating characteristic of the cluster of the network.

In one embodiment, the processing logic is operable to cease iteratively selecting an optimisable network node from within the network when at least one of: an operating characteristic threshold is exceeded; and less than a threshold change in operating parameters occurs.

According to a third aspect, there is provided a computer program product operable, when executed on a computer, to perform the method of the first aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Before discussing the embodiments in any more detail, first an overview will be provided. Embodiments provide an approach whereby a network node (such as a controller node) within a network (such as a wireless telecommunications network) controls the optimization of the operation of those network nodes. The controller node selects an operating characteristic of the network to optimise. It will be appreciated that various operating characteristics may be selected, such as coverage, capacity, power consumption, throughput, quality of service, etc. Operating parameters of network nodes which affect the selected operating characteristic are selected. It will be appreciated that various operating parameters may be selected, such as transmission power, cell bias, almost blank frame pattern and reduced power, encoding or modulation scheme, etc. An optimisation scheme is derived from the players (typically network nodes within the network), a payoff function related to the operating characteristic to be optimised and other operating factors or constraints (such as allowable interference, power consumption, etc.). Individual changes in individual operating parameters of a network node are performed and an assessment is made of how those changes impact on the operating characteristic of a cluster or group of network nodes. The change which best improves the operating characteristic of the cluster is then selected. The process repeats for other changes in operating parameters of network nodes until an end point is reached (for example, less than a threshold amount of improvement occurs).

Figure 1:
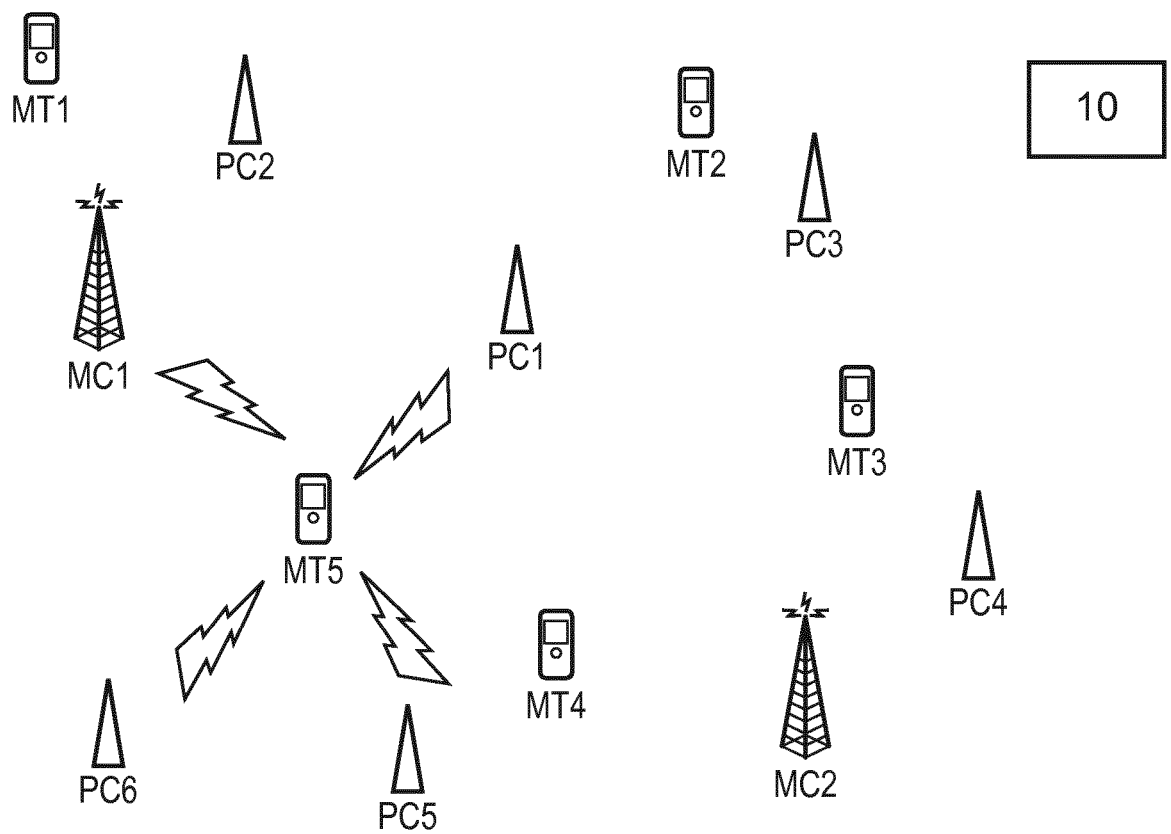
FIG. 1 illustrates the arrangement of a network according to one embodiment.

FIG. 1 illustrates the arrangement of such a network in which macro base stations MC1, MC2 are provided, within which are provided Pico or other small cell base stations PC1-PC6. Mobile terminals MT1-MT5, roam within the cell coverage areas provided. A network controller 10 is provided which controls optimization of operating parameters of the base stations in order to improve the operating performance of the network.

Figure 2:
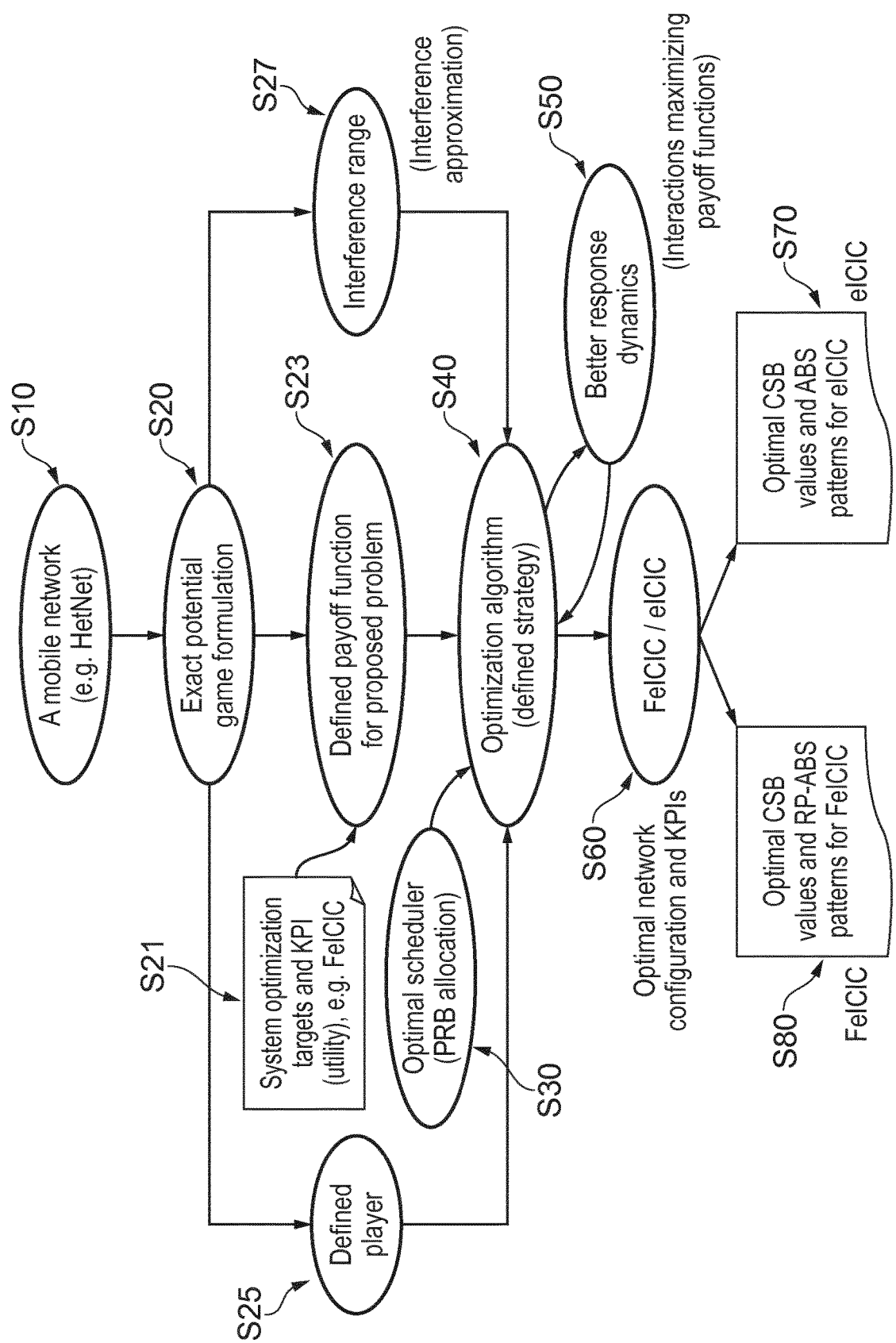
FIG. 2 is a flowchart illustrating the main processing steps performed by the controller according to one embodiment.

FIG. 2 is a flowchart illustrating the main processing steps performed by the controller 10.

At step S10, the configuration of the network is identified.

At step S20, a game is formulated.

At step S25, the players are identified, such as, for example, network nodes such as base stations.

At step S27, the extent of interference ranges acceptable within the network is defined.

At step S21, particular system optimization targets, key performance indicators and other operating characteristics are identified and used at step S23, together with the gain formulation, to define a payoff function for the problem posed.

At step S30, optimal schedulers are identified and, at step S40, an optimization algorithm is used which utilised the defined players, the payoff function and the interference range to optimize operating parameters within the network. The optimization algorithm is followed and the response of the network is evaluated at step S50 for each change in operating parameter.

At step S60, the changed operating parameters are derived and, at step S70, these are utilised for EICIC networks, whereas at step S80 the adjusted parameters are used for FEICIC networks.

Figure 3:
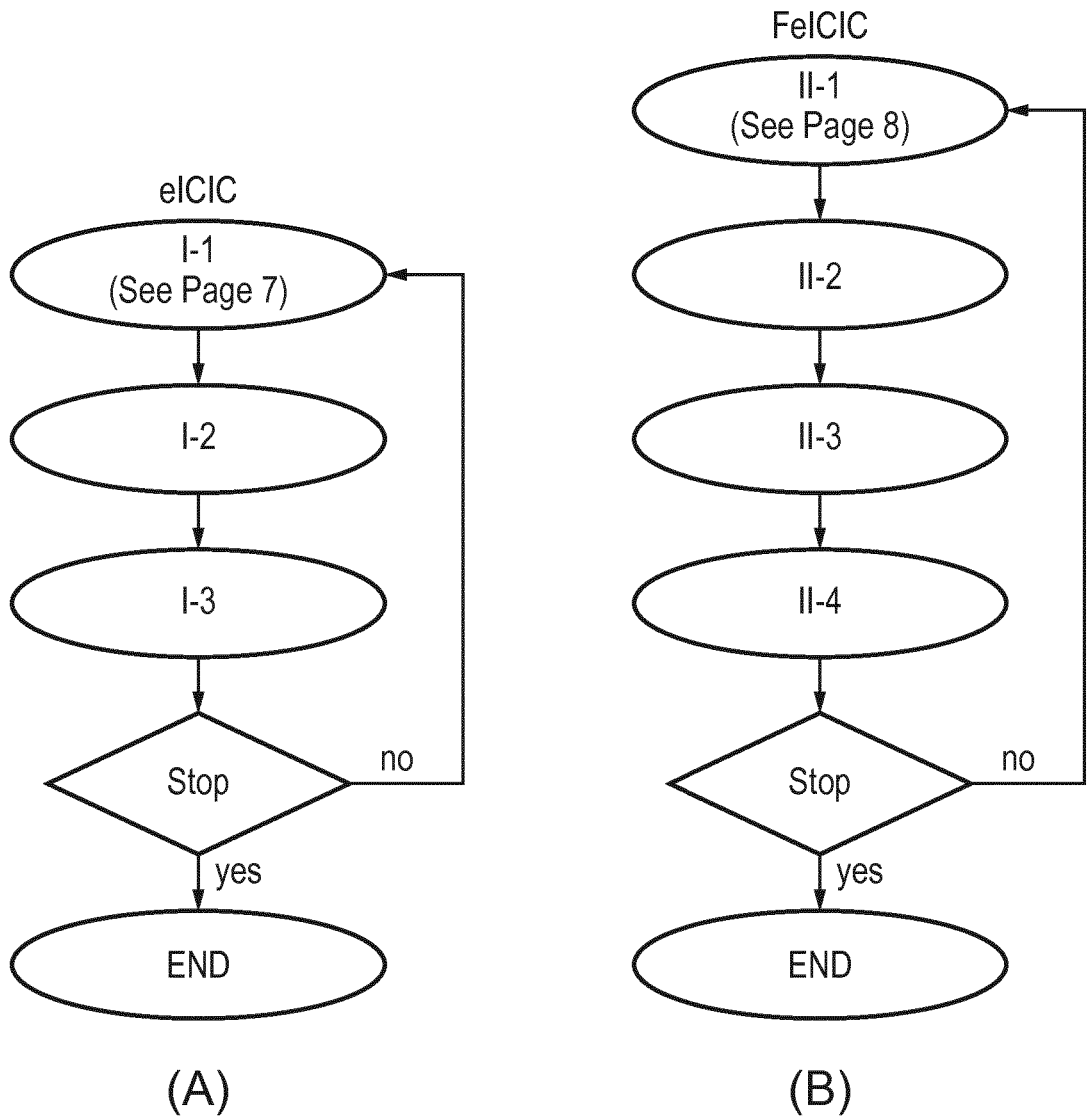
FIG. 3A illustrates the optimization procedure for eICIC networks according to one embodiment.
FIG. 3B illustrates the optimization procedure for FeICIC networks according to one embodiment.

FIG. 3A illustrates the optimization procedure performed by the controller 10 for EICIC networks as will be explained in more detail below. At step I-1, randomly select a player i from L. At step I-2, randomly select a pico BS p in the set of BSs represented by player i. At step I-3, denote the macro BS in the hexagon of player i as m. For all possible elements in A×C, perform scheduling for all BSs in $N_i^{Att}$ using scheduler ϕ and evaluate $V_i$. Select the element in A×C that maximizes $V_i$. At step I-4, repeat the above steps until some stopping criterion is met.

FIG. 3B illustrates the optimization procedure performed by the controller 10 for FEICIC networks. At step II-1, randomly select a player i from L. Denote the macro BS in player i as m. At step II-2, randomly select a pico BS p from the set of BSs represented by player i. At step II-3, for each possible CSB values of pico BS p, (a) perform scheduling for all stations in $N_i^{Att}$ using scheduler φ, assuming that it transmits at full power on all PRBs, (b) for each element in {b|τ(b)∈ˆA}, perform power optimization on macro BS m's transmission power by solving PowerAllocation, (c) perform scheduling for all stations in $N_i^{Att}$ using the scheduler φ and evaluate $V_i$.

At step II-4, select the strategy of player i that maximizes $V_i$. At step II-5, repeat the above steps until some stopping criterion is met.

As will be explained in more detail in the disclosure below, through this approach the operation of the network can be improved or optimized iteratively in a way that ensures convergence of the operating parameters.

I. INTRODUCTION

According to an estimate of the growth of mobile data volume [1], more capacity must be added to the current cellular networks. Cell densification, due to its ability of reusing spectrum geographically and its property of preserving signal-to-interference-plus-noise ratio (SINR) [2], serves as a promising candidate solution to meet the demand of mobile users [3]. Contrary to the traditional cell densification where more high-power base stations (BSs) are added, it is more practical to add low-power BSs due to the high cost of installing macro BSs and the shortage of available sites suitable for macro BSs [4], which gives rise of the development of heterogeneous networks (HetNets).

The emergence of HetNets gives rise to two challenging network management problems. First, because pico BSs transmit at low power levels compared to macro BSs, mobile users who are physically located near pico BSs may be attracted to macro BSs, which can create underutilized pico BSs and overcrowded macro BSs. Therefore, in order to fully utilize the available resources in BSs with different transmission power, careful treatment is needed when performing user association. Second, the surrounding macro BSs of a pico BS can generate large interference to a user associated to the pico BS, and such inter-cell interference must be well-managed in order to prevent pico BSs' users from suffering very low downlink throughputs. To solve these issues, enhanced inter-cell interference coordination (eICIC) has been proposed in Release-10 of the 3GPP LTE standards, where 1. Cell selection bias (CSB) is used to offset the received signal power from BSs to a user so that a user is not necessarily associated with the BS that provides the strongest received power, and
2. Almost blank subframe (ABS) can be configured in macro BSs so that the macro BSs cease data transmissions in certain time slots, which reduces interference to pico BSs.

The use of ABSs can help reduce the interference from macro BSs to pico BSs. However, the restriction that macro BSs must mute their data transmissions entirely in ABSs may result in the inefficient use of the increasingly-scarce resources. In Release-11, further enhanced inter-cell interference coordination (FeICIC) has been proposed, where instead of offering ABSs, macro BSs can configure reduced-power almost blank subframes (RP-ABSs) in which the macro BSs can allocate their users and transmit at reduced power levels.

Clearly, the configurations of CSB values and ABS patterns in eICIC optimization are coupled because the amount of ABSs depends on the load on pico BSs which depends on CSB values. To achieve the maximum possible performance gain using eICIC, joint optimization in ABS patterns and CSB values is required. Similarly, we must jointly consider RP-ABS patterns and CSB values when doing FeICIC optimization. While eICIC optimization algorithms have been studied in [5]-[15], little attention is paid on the algorithm that performs FeICIC optimization.

In this disclosure, we propose an exact potential game framework that is suitable for performing both eICIC and FeICIC optimizations. Specifically, we make the following contributions:

1. A distributed optimization framework: Based on the exact potential game framework, we propose a scalable distributed algorithm that can either jointly optimize ABS and CSB patterns or jointly optimize RP-ABS and CSB patterns. The game theoretic framework can adapt itself to various system optimization targets, such as proportional fairness (PF) and sum rate maximization.
2. Performance evaluation: We evaluate the performance gain due to FeICIC and eICIC optimizations. Simulation results show that, compared to the case when no optimization is performed, FeICIC can nearly double the energy efficiency (EE) while eICIC provides about a 64% improvement on EE. Also, FeICIC provides higher fairness in the throughputs of the users and better cell-edge throughputs compared to eICIC.
3. A better downlink scheduler: We propose a downlink scheduler based on a cake-cutting algorithm. Simulation results show that the proposed scheduler can further improve the EE and spectral efficiency (SE) by 10% compared to conventional schedulers, can provide better fairness in SE, and is about 20 times faster than conventional convex algorithms.

Related Work

A number of eICIC optimization algorithms have been proposed in the literature. Tall et al.'s algorithm in [5] decouples the ABS optimization and CSB optimization, where the ABS patterns are simplified as fractional numbers. A centralized algorithm is proposed by Deb et al. in [6], where ABS and CSB patterns are jointly optimized and the surrounding macro BSs of a pico BS must offer ABSs on the same subframes. In [7], a distributed algorithm is proposed by Pang et al. where the number of ABSs is determined without considering CSB. Thakur et al. considered the problem of CSB optimization and power control in [8]. Bedekar and Agrawal, in [9], simplify the joint ABS and CSB optimization problem so that the optimization of ABS ratios and user attachment are solved separately. Simsek et al. propose a learning algorithm that optimizes CSB patterns in frequency domain in [10] and further extend the idea to optimizing CSB patterns in both time and frequency domain in [11]. Liu et al., in [12], propose to optimize the probability that a macro BS offers almost blank resource blocks on both time and frequency dimensions. Potential game based solutions for distributed eICIC optimization are considered in [13]-[15].

The benefit of FeICIC against eICIC has been analyzed in [16] using stochastic geometric approach, where the expressions for SE and cell-edge throughputs have been derived as a function of the power reduction factor on the RP-ABSs. However, the power reduction factor on all RP-ABSs is assumed to be the same in [16]. An optimization algorithm that can dynamically adjust the transmission power on each RP-ABS has not been considered to our best knowledge.

In this work, we address the FeICIC optimization problem based on exact potential game models. We adapt the game theoretic frameworks in [14], [15] so that power control on each time-frequency slot, i.e., physical resource block (PRB), are included during the optimization process. Also, we rigorously discuss the necessary assumptions which are needed for the validity of the exact potential game formulations and evaluate the effect of such assumptions. Moreover, we evaluate the performance of a downlink scheduler based on a cake-cutting algorithm and compare it against conventional schedulers.

Organization and Notation

The next parts of this disclosure are organized as follows. Section II gives the system model of the LTE-A HetNets. Section III formulates the eICIC and FeICIC optimization problems. Section IV develops the exact potential game framework that is suitable for eICIC and FeICIC optimizations. Section V describes the strategy sets and the better response dynamics of the games for eICIC and FeICIC optimization. Section VI introduces the cake-cutting downlink scheduler and other benchmark schedulers. Section VII presents the numerical studies. Finally, Section VIII draws conclusions.

Unless otherwise specified, we use small letters such as a to denote scalars, bold small letters such as a to denote vectors, letters such as A to denote sets. Also, |A| returns the number of elements in set A and ∅ denotes the empty set. A\B gives the elements in set A that are not in set B.

II. SYSTEM MODEL

Figures 4A, 4B:
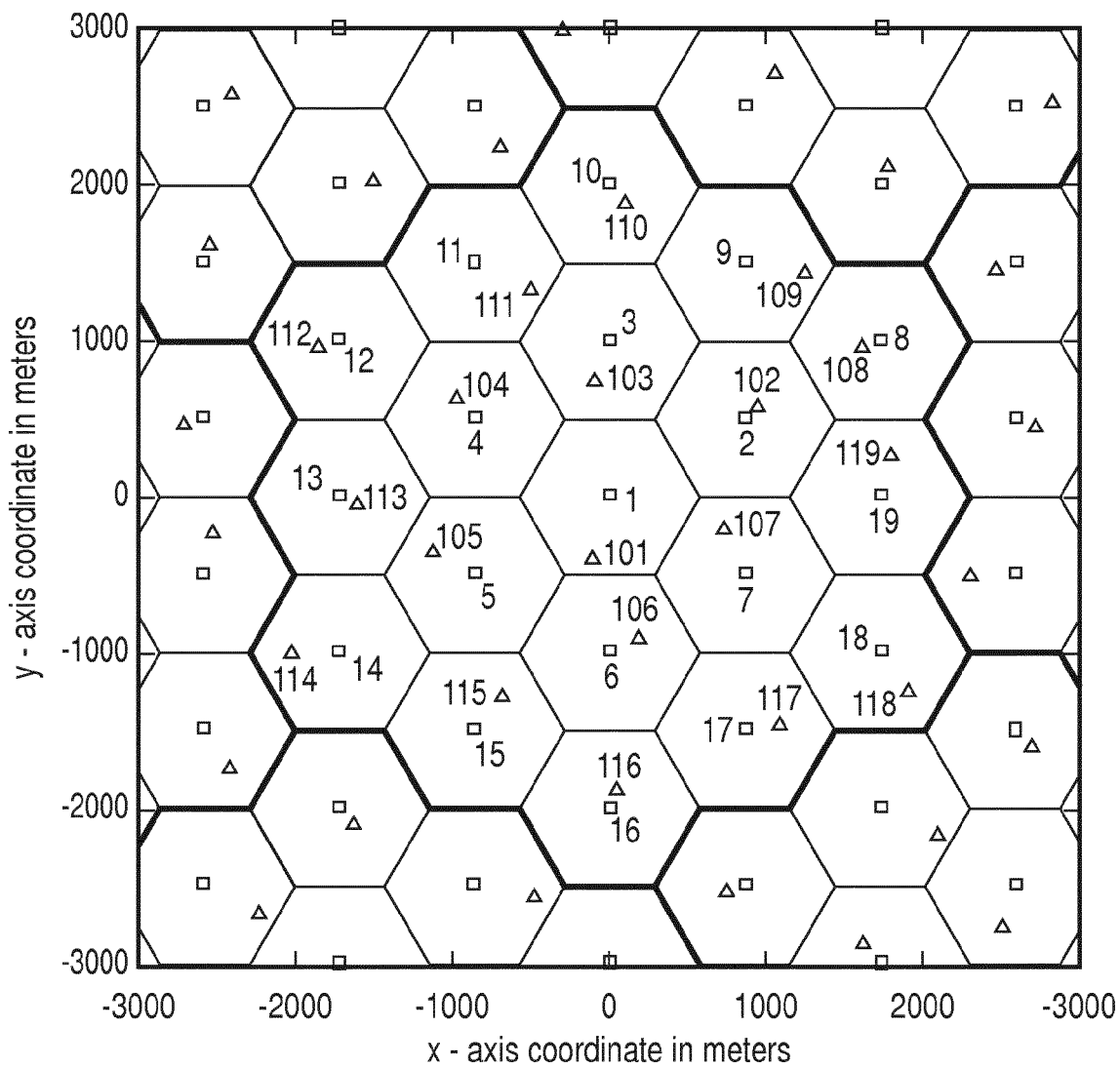
FIG. 4A illustrates an example of a hexagonal HetNet layout. The squares represent the macro BSs and the triangles represent the pico BSs. Users are not displayed for the sake of clarity.
FIG. 4B illustrates ABS patterns that can be chosen by a macro BS.

Consider a randomly generated HetNet as shown in FIG. 4A, which consists of macro BSs and pico BSs, where the squares represent macro BSs and the triangles represent pico BSs. Denote M and P as the set of all macro BSs and the set of all pico BSs, respectively. Also, denote $M_C$ and $P_C$ as the macro BSs in the center cluster of the HetNet and pico BSs in the center cluster of the HetNet, respectively, where the center cluster is surrounded by bolded borders in FIG. 4A. Six clusters which are identical to the center clusters are placed around the center cluster. We make such distinction between the center cluster and other clusters because we only care about the optimization of the BSs in the center cluster, and the surrounding clusters are generated only to realize the interference as encountered in practice. We assume that there is only one macro BS located at the center of each hexagon, and each hexagon has the same number of pico BSs, e.g., one pico BS per hexagon in FIG. 4A.

Let $N(i,n)$ be BS i's neighboring BSs that are located in the n-th layer of hexagons with respect to (w.r.t.) the hexagon in which BS i is located, where $I \in M \cup P$. The 0-th layer of hexagons w.r.t. the hexagon $\xi$ is $\xi$ itself, and the n-th layer of hexagons w.r.t. $\xi$ are the hexagons that are adjacent to the $(n-1)$-th layer of hexagons of except the hexagons which are in the $(n-2)$-th layer of hexagons w.r.t. $\xi$ in case $n-2$ is a nonnegative integer. For example, in FIG. 4A, $N(1,0)$ gives $\{10\ 1\}$, $N(10\ 1,0)$ gives $\{1\}$, both $N(1,1)$ and $N(10\ 1,1)$ give $\{2,3,4,5,6,7,102,103,104,105,106,107\}$, and both $N(1,2)$ and $N(101,2)$ give the set of BSs in the center cluster except the BSs in $\{1, 101\} \cup N(1,1)$. The definition of $N(i,n)$ can also be easily extended to the case where i represents a set of BSs located in the same hexagon.

Let U be the set of all users in the system. Denote $m_u$ as the macro BS that is located in the same hexagon as user u. We assume that only the BSs in the same hexagon or in the adjacent hexagons can serve a user. In other words, the set of candidate BSs that can serve user u is given as:

$$O_u \triangleq \{m_u\} \cup N(m_u, 0) \cup N(m_u, 1).$$

Define vector $\gamma_{O_u}$ as the CSB values of all BSs in $O_u$ and let $\gamma_{O_u}(i)$ gives the CSB value of BS i, where $i \in O_u$. The set C contains all possible values that $\gamma_{O_u}(i)$ can take. Let $P_{i,u}^{Rx}$ be the reference signal received power (RSRP) of user u from BS i when the BS is transmitting at its full power. The exact value of $P_{i,u}^{Rx}$ depends on the distance between BS i and user u and the loss due to shadow fading. The effect of fast fading is assumed to be averaged out for $P_{i,u}^{Rx}$. The following equation gives the BS that serves user u:

$$g(u, \gamma O_u) \triangleq \underset{i \in O_u}{\arg\max}(P_{i,u}^{Rx} + \gamma O_u(i)). \quad (1)$$

Let $U_B$ be the set of users who are associated with BSs in the set B, i.e., $$U_B \triangleq \{u | g(u, \gamma O_u) \in B\}.$$

Clearly, $U_B$ is a function of the CSB values of the BSs in B and their nearby BSs. Let $\gamma$ denote the vector which specifies all BS's CSB values.

Suppose each BS has $N_T$ subframes in the time domain and $N_F$ resource blocks (RBs) in the frequency domain. All subframes have the same duration and all RBs are identical in terms of bandwidth. A PRB is formed by a pair of subframe and RB, and we denote $N_B := N_T N_F$ as the total number of PRBs available at each BS. It is assumed that all subframes and RBs of all BSs are synchronized.

Let the length $N_T$ vector $\alpha_m$ specify the ABS pattern of macro BS m, where all the entries in $\alpha_m$ are binary. Let A contain all possible ABS patterns that a macro BS can adopt, where each element in A consists of a binary vector of length $N_T$. Also, let $\hat{A}$ be a subset of $\{1, 2, \ldots, N_T\}$ which contains the indices of subframes which can be an ABS as indicated in any element in A. For example, suppose $A = \{(0,1,1,1), (0,1,0,1), (0,0,0,1)\}$, then $\hat{A} = \{1,2,3\}$ because subframes 1, 2, and 3 are possible ABSs.

Let $\tau(b)$ be the subframe index of PRB b. Moreover, let $\hat{\alpha}_m$ be a vector of length $N_T \times N_F$ whose elements specify the power allocation of macro BS m on each PRB, where $\hat{a}_m(b)$ is a real number between 0 and 1 for $\tau(b) \in \hat{A}$ and $\hat{\alpha}_m(b)$ is fixed to be one for $\tau(b) \in \{1, 2, \ldots, N_T\} \backslash \hat{A}$. The vector $\hat{\alpha}_m$ then defines the RP-ABS pattern of macro BS m. Note that although it is not necessary to assume that a macro BS offers RP-ABS only in the subframes specified by $\hat{A}$, the definition of $\hat{\alpha}_m$ aims at offering a fair comparison between FeICIC optimization and eICIC optimization.

In this disclosure, we assume that only the macro BSs would offer ABSs/RP-ABSs while the pico BSs always transmit on all subframes. Such an assumption is reasonable because:

1. The macro BSs have much more transmission power than the pico BSs. Consequently, the macro BSs are the main source of interference in the network.
2. The complexity of the resulting eICIC/FeICIC optimization is reduced compared to the case where all stations offer ABSs/RP-ABSs.

Also, we assume that only the pico BSs may set their CSB values to some positive numbers while the macro BSs fix their CSB values to zeros. This is because, in general, it is the coverage range of a pico BS which need to be extended in order to better utilize the available resources from the pico BS.

Given the above definitions, the signal-to-noise-plus-interference ratio (SINR) of user u on PRB b when associated with macro BS m can be calculated as:

$$SINR_{u,b}^m = \begin{cases} \dfrac{h_{u,b}^m P_{m,u}^{Rx} \cdot \alpha_m(\tau(b))}{P_{I_m,u,b}^{IF} + N_0 W}, & BS\ m\ \text{offers}\ ABSs, \quad (2a) \\ \dfrac{h_{u,b}^m P_{m,u}^{Rx} \cdot \hat{\alpha}_m(\tau(b))}{P_{I_m,u,b}^{IF} + N_0 W}, & BS\ m\ \text{offers}\ RP\text{-}ABSs, \quad (2b) \end{cases}$$

where $h_{u,b}^m$ gives the fast fading gain on PRB b from macro BS m to user u, $\tau(b)$ returns the subframe index of PRB b, $I_m$ denotes the set of BSs whose transmission will interfere the users located in the same hexagon as macro BS m, $P_{I_m,u,b}^{IF}$ is the sum of interference at user u received from BSs in $I_m$ at PRB b, $N_O$ denotes the additive white Gaussian noise (AWGN) spectral density and W is the bandwidth of a PRB. Similarly, the SINR of user u on PRB b when associated with pico BS p is given by:

$$SINR_{u,b}^p = \dfrac{h_{u,b}^p P_{p,u}^{Rx}}{P_{I_m,u,b}^{IF} + N_0 W}, \quad (3)$$

where a pico BS does not offer ABS/RP-ABS as discussed before. Let $r_{u,b}$ be the achieved rate of user u at PRB b, where $b \in [1, N_B]$. It is assumed that the serving BS knows the achieved rate of user u at PRB b, and the achieved rate is calculated by Shannon's capacity formula, i.e., $$r_{u,b} = \begin{cases} W \cdot \log_2(1 + SINR_{u,b}^m), & g(u, \gamma O_u) = m \in \mathcal{M}, \\ W \cdot \log_2(1 + SINR_{u,b}^p), & g(u, \gamma O_u) = p \in \mathcal{P}. \end{cases}$$

Table I summarizes the notation used in this disclosure:

TABLE I

| Notation | Description |
|---|---|
| $\alpha_m$ | ABS pattern of macro BS m |
| $\hat{\alpha}_m$ | RP-ABS pattern of macro BS m |
| $\gamma$ | Vector specifying CSB values of all BSs |
| $\gamma_{O_u}$ | Vector specifying CSB values of BSs in $O_u$ |
| $g(u, \gamma_{O_u})$ | The BS that user u is associated with |
| $m_i$ | The macro BS located in the same hexagon as an object with index i, where the object can be a user or a pico BS |
| $r_{u,b}$ | Achieved rate of user u at PRB b |
| $\tau(b)$ | The subframe index of PRB b |
| $w_u$ | Weighting factor on the achieved rate of UE u |
| $x_{u,b}$ | Indicator of whether user u occupies PRB b of the serving cell |
| $N_O$ | Noise power spectral density |
| $N_B$ | Number of PRBs |
| $N_F$ | Number of RBs (in frequency domain) |
| $N_T$ | Number of subframes (in time domain) |
| $V_i$ | The payoff function of player i |
| W | Bandwidth per RB |
| A | Set of vectors from which macro BSs can choose their ABS patterns |
| $\hat{A}$ | Set containing indices of subframes which can be ABSs |
| C | Set of CSB values from which a pico BS can choose from |
| $I_m$ | Set of BSs whose transmissions interfere the users located in the same hexagon as BS m |
| L | The set of players in the potential game model |
| M | Set of all macro BSs |
| $M_c$ | Set of macro BSs in the center cluster |
| N (i,n) | The set of BS i's neighboring BSs located in the n-th layer of hexagons w.r.t. the hexagon that contains i |
| $O_u$ | Candidate BSs who can serve user u |
| P | Set of all pico BSs |
| $P_c$ | Set of pico BSs in the center cluster |
| $S_i$ | The strategy set of player i |
| U | Set of all users in the system |
| $U_i$ | Set of users associated with BSs in set i or with BS i |

III. PROBLEM FORMULATION

Let the binary variable $x_{u,b}$ indicate whether PRB b is allocated to user u by its serving BS, where $x_{u,b}=1$ means that PRB b is allocated to user u and $x_{u,b}=0$ means otherwise. To discriminate the importance of different users, positive weighting factors are applied, where we denote $w_u$ as the weighting factor for user u.

We are now ready to formulate the eICIC optimization problem as follows

MaxPfUtility-I $$\text{maximum} \sum_{i \in M \cup P} \sum_{u \in U_i} w_u \cdot \ln \sum_{b=1}^{N_B} (x_{u,b} \cdot r_{u,b}), \quad (4)$$

$$\text{subject to } \sum_{u \in U_m} x_{u,b} = \alpha_m(\tau(b)),$$

$$\forall m \in M_c, b \in [1, N_B],$$

$$\alpha_m \in A, \quad (5)$$

$$\sum_{u \in U_p} x_{u,b} = 1, \forall p \in P_c, b \in [1, N_B], \quad (6)$$

$$x_{u,b} \in \{0, 1\}, \forall u \in U, b \in [1, N_B], \quad (7)$$

$$\gamma(i) \in C, \forall i \in P_c, \quad (8)$$

where (5) specifies that a macro BS can adopt one of the ABS patterns in A and only non-ABS PRBs can be assigned to the users, (6) states that all PRBs from pico BSs can be allocated to the users, (7) means that one PRB can be assigned to only one user, and (8) means that a pico station can adopt one of the CSB values specified in C.

For the FeICIC optimization in which macro BSs may offer RP-ABSs, we aim at solving the following problem MaxPfUtility-II $$\text{maximum} \sum_{i \in M \cup P} \sum_{u \in U_i} w_u \cdot \ln \sum_{b=1}^{N_B} (x_{u,b} \cdot r_{u,b}), \quad (9)$$

$$\text{subject to } \hat{\alpha}_m(b) \in [0, 1], \quad (10)$$

$$\tau(b) \in \hat{A}, \forall m \in M_c,$$

$$\hat{\alpha}_m(b) = 1, \tau(b) \in \{1, 2, \ldots, N_T\} \setminus \hat{A}, \forall m \in M_c, \quad (11)$$

$$\sum_{u \in U_i} x_{u,b} = 1, \forall i \in M_c \cup P_c \in [1, N_B], \quad (12)$$

(7) and (8), where (10) means that power allocation is optimized on PRBs whose subframe indices are in $\hat{A}$ and (11) means that no power optimization is performed on PRBs whose subframe indices are not in $\hat{A}$. Because there is no restriction on a macro station that it must completely mute its transmission on a subframe in FeICIC optimization, every PRB from a macro station can be allocated to at most one user as specified in (12).

Note that the objective functions of both MaxPfUtility-I and MaxPfUtility-II are defined as the sum of logarithm of users' throughputs. Such an objective achieves the proportional fairness among the users' achievable rates, which strikes a good trade-off between aggregate network throughput and user fairness [17]. Also, different realizations of $\gamma$ will affect the elements inside $\{U_i | i \in P_c\}$, which is how CSB optimization comes into the problems MaxPfUtility-I and MaxPfUtility-II.

In the next theorem, we show the NP-hardness of MaxPfUtility-I and MaxPfUtility-II.

Theorem 1 Both MaxPfUtility-I and MaxPfUtility-II are NP-hard.

Proof. Consider the case where no ABS/RP-ABS is applied in any macro BS and all pico BSs fix their CSB values to zeros, and assume there is only one element in $M_c \cup P_c$. We then obtain a special case for both MaxPfUtility-I and MaxPfUtility-II where the only problem left is to decide how to allocate the PRBs of a single BS. We denote this special case as PRB-Allocation which can be described as follows:

PRB-AlloCation $$\text{maximize} \sum_{u \in U_i} w_u \cdot \ln \sum_{b=1}^{N_B} (x_{u,b} \cdot r_{u,b}), \quad (13)$$

$$\text{subject to } \sum_{u \in U_i} x_{u,b} = 1, b \in [1, N_B], \quad (14)$$

$$x_{u,b} \in \{0, 1\}, \forall u \in U_i, b \in [1, N_B]. \quad (15)$$

It is shown in [18] that PRB-Allocation is NP-hard. Therefore, both MaxPfUtility-I and MaxPfUtility-II are NP-hard because a special case of the two problems is NP-hard.

In the next section, we propose a potential game based framework which can be applied to both MaxPfUtility-I and MaxPfUtility-II to solve the problems distributedly and heuristically.

IV. EXACT POTENTIAL GAME FORMULATION

In this section, we frame the eICIC and FeICIC optimization problems as exact potential games. Our approach is motivated by the successful application of potential games to another scenario in [19] which concerns BS power control and user association.

A. Preliminary

A finite game consists of a finite set of players, a finite set of strategies of each player, and the payoff functions of the players, where the payoff of a player is a function of the strategies played by all the players. A strategy profile gives the strategies adopted by all the players, and a Nash equilibrium is a strategy profile s* such that no player can improve its payoff by playing a different strategy than the one specified in s* while other players keep their strategies same.

A game is called an exact potential game if there exists an exact potential function such that change in the value of the exact potential function due to a change of a player's strategy is the same as the change of the player's payoff. In a finite exact potential game, a Nash equilibrium can be achieved if players take turns randomly and play their best responses or better responses [20], where, given that all other players fix their strategies, 1. A best response is the player's strategy that maximizes the player's payoff function.
2. A better response is the player's strategy that improves the payoff function of the player.

Being able to formulate the eICIC and FeICIC optimization problems as exact potential games will allow us to solve them distributively using simple algorithms.

In order to realize the process by which a macro BS adapts its ABS/RP-ABS pattern when a pico BS in the same hexagon optimizes its CSB value, it is convenient to define a player as a union of a macro BS and the pico BSs within the same hexagon. Let L be the set of players, where each element in L consists of a set that contains the macro BSs and the pico BSs in a hexagon in the center cluster. We can then denote the game as $$\Gamma \triangleq \langle L, \{S_i; i \in L\}, \{V_i; i \in L\} \rangle$$

where $S_i$ is the strategy set of player i and $V_i$ is the payoff function of player i. Note that the game structure $\Gamma$ can be applied to both eICIC and FeICIC optimization problems because the two problems have the same players and the same objective functions. The only difference between the eICIC optimization and the FeICIC optimization is the power allocation constraint on the PRBs, and this difference can be captured by the definitions of the respective strategy sets. The details of the strategy sets and payoff functions will be discussed later.

When a player changes its strategy during the game for eICIC optimization, this will affect not only the users who are associated with the BSs represented by the player but also the users who are associated with other nearby BSs. A similar situation will also occur in the game for FeICIC optimization. Consequently, to achieve a good system performance for both MaxPfUtility-I and MaxPfUtility-II, the payoff function of a player should take users who are located in nearby hexagons into account, even if these users are not being served by the player. On the other hand, the transmission of a BS can, in theory, interfere users located very far away. To ensure accuracy, the payoff function of a player should then consider all users in the system. However, such a payoff function will introduce high complexity to the optimization process and at the same time deviate from the intention of designing a distributed algorithm. Therefore, for a low complexity distributed algorithm, some approximation on the interference is necessary. It is therefore important to first identify the impact of changing ABS/RP-ABS and CSB patterns before defining a reasonable payoff function that allows the existence of an exact potential function.

In the following, we will first discuss which neighboring BSs of player i can be affected by changes in player i's CSB values (more accurately, by changes of the CSB values of the pico BSs represented by player i) and the interaction between interference approximation and the CSB impact range. We then define the payoff function of players and identify an exact potential function based on some interference approximation. Details of the strategy sets, the algorithms that converge to a Nash equilibrium, and the downlink schedulers will be given in later sections.

B. Neighboring Sets of a Player

As mentioned in previous discussion, the transmission of a BS causes interference to all users in the system, even if some of them are very far away, as the link gain between the BS and a user is never zero. In our framework, we make an approximation that the interference range of a BS is limited only to some of its neighboring hexagons, because the interference power from a BS to a user is negligible if the user is located far away from the BS. We use $N_i^{IF}$ to specify the set of BSs whose hexagons are interfered by player i. More precisely, it means that a user is interfered by the transmission of the BSs represented by player i if and only if he is located in the hexagon of a BS that belongs to $N_i^{IF}$. For example, if it is assumed that player i causes interference to only with its closest $\beta$ layers of neighboring hexagons, then $N_i^{IF} = \cup_{j=0}^{\beta} N(i,j)$.

Let $N_i^{Att}$ contains the BSs whose user attachment patterns depend on the CSB values of the pico BSs represented by player i. Clearly, the actual serving BS of a user depends on the CSB values of the pico BSs represented by player i, if a BS represented by player i is a candidate serving BS of that user. Moreover, because user u can be attached to any station in $O_u$, the actual serving station of user u depends on the CSB values of all BSs in $O_u$. Therefore, $$N_i^{Att} = \bigcup_{\{\forall u | \{i\} \subset O_u\}} O_u. \tag{16}$$

The next proposition shows which elements constitute $N_i^{Att}$.

Proposition 1. $N_i^{Att} = i \cup N(i,1) \cup N(i,2)$.

Proof. See Appendix A.

Define the utility of player i as $$U_i(s) \triangleq \sum_{u \in \mathcal{U}_i} w_u \cdot \ln \sum_{b=1}^{N_B} (x_{u,b} \cdot r_{u,b}), \tag{17}$$

where s is the strategy vector that specifies the strategies played by all players. Let $N_i$ contain player i and player i's neighboring BSs whose downlink users' SINRs and/or whose user attachment patterns can be affected by changing the ABS/RP-ABS patterns and CSB values of player i. The next proposition shows the elements in $N_i$ when $N_i^{IF}=i \cup N(i,1)$.

Proposition 2. Suppose $i \in L$ and $N_i^{IF}=i \cup N(i,1) \cup \{j\}$. Keeping $s_{-i}$ unchanged, changes in $s_i$ may affect $U_j$ only if $j \in N_i^{An}$. In other words, $N_i = N_i^{An}$.

Proof. See Appendix B.

The approximation on the interference range, i.e. the definition of $N_i^{Att}$ is crucial to the constitution of $N_i$. This is demonstrated in the next proposition.

Proposition 3. Suppose $i \subset L$ and $N_i^{IF}=i \cup N(i,1) \cup \{j\}$, where $j \in N(i,2)$, then $N_i^{Att} \cup N_i$.

Proof. See Appendix C.

C. Exact Potential Game Formulation

The key to the exact potential game formulation lies in the appropriate definition of the payoff function. We first define some notations regarding the strategies of players before defining the payoff function. Then, we show there exists an exact potential function with respect to our payoff function.

Let $s_i$ be the strategy that player i adopts, where $s_i \in S_i$. Define $$s_{-i} \triangleq (s_1, \ldots, s_{i-1}, s_{i+1}, \ldots, s_{|\mathcal{M}_c|})$$

to be the strategies of all players other than player i. Denote $$(\tilde{s}_i, s_{-i}) \triangleq (s_1, \ldots, s_{i-1}, \tilde{s}_i, s_{i+1}, \ldots, s_{|\mathcal{M}_c|})$$

as the strategies of all players, where player i selects strategy $\tilde{s}_i$ and other players' strategies are specified as $s_{-i}$. The payoff function of player i is defined as $$V_i(s) \triangleq \sum_{j \in N_i^{Att}} U_j(s), \qquad (18)$$

and the aggregate utility of all the players is given as $$U(s) = \sum_{i \in \mathcal{L}} U_i(s). \qquad (19)$$

In the following theorem, we show that when $N_i^{IF}=i \in N(i,1)$, $U(s)$ is an exact potential function.

Theorem 2 $N_i^{IF}=i \cup N(i,1)$, then $U(\bullet)$ is an exact potential function of the game $\Gamma$. Moreover, $\Gamma$ is an exact potential game.

Proof. Suppose player i changes its strategy, so that the strategies played by all players changes from s to $(\tilde{s}_i, s_{-i})$. The change in $U(\bullet)$ due to this unilateral change of player i's strategy is:

$$U(\tilde{s}_i, s_{-i}) - U(s) = \sum_{j \subset \mathcal{L}} (U_j(\tilde{s}_i, s_{-i}) - U_j(s)) \qquad (20)$$

$$= \sum_{j \subset N_i^{Att}} (U_j(\tilde{s}_i, s_{-i}) - U_j(s)) + $$

$$\sum_{j \subset \mathcal{L} \setminus N_i^{Att}} (U_j(\tilde{s}_i, s_{-i}) - U_j(s))$$

$$= \sum_{j \subset N_i} (U_j(\tilde{s}_i, s_{-i}) - U_j(s)) + $$

$$\sum_{j \subset \mathcal{L} \setminus N_i} (U_j(\tilde{s}_i, s_{-i}) - U_j(s))$$

$$= \sum_{j \subset N_i} (U_j(\tilde{s}_i, s_{-i}) - U_j(s)) \qquad (21)$$

$$= \sum_{j \subset N_i^{Att}} (U_j(\tilde{s}_i, s_{-i}) - U_j(s)) \qquad (22)$$

$$= V_i((\tilde{s}_i, s_{-i})) - V_i(s), \qquad (23)$$

where (20) and (22) follow from Proposition 2, (21) follows from the definition of $N_i$, and (23) follows from the definition of the payoff function. Equation (23) indicates that the change of $U(\bullet)$ due to the change of a player's strategy is exactly the same the change of the payoff function of that player. This proves that $U(\bullet)$ is an exact potential function of the game $\Gamma$. Consequently, $\Gamma$ is an exact potential game because it admits an exact potential function.

Note that the above potential game framework can also be used to optimize utility functions other than proportional fairness. For example, in case the objective function in MAXPFUTILITY-I and MAXPFUTILITY-II is the sum of all users' rates, then the same potential game framework can still be used except that now the utility function of player i should be $$\Sigma_{u \in U_i} w_u \cdot \Sigma_{b=1}^{NB}(x_{u,b} \cdot r_{u,b}).$$

V. STRATEGY SETS AND OPTIMIZATION ALGORITHMS

In this section, we define the strategy sets of the players for the eICIC and FeICIC optimizations based on exact potential game formulations. We also provide the algorithms that solve the exact potential games for eICIC and FeICIC optimizations.

A The Strategy Sets and the Algorithm for eICIC

By definition, $r_{u,b}$ is a function of the ABS patterns of the macro BSs in $N_i^{IF}$ and the CSB values of the pico BSs in $N_i^{Att}$, where $i \in L$. Moreover, $x_{u,b}$ is a function of the downlink scheduler of the serving BS of user u. Therefore, the strategy of a player should specify the ABS pattern of the macro BS represented by player i, the CSB values of the pico BSs represented by player i, and the way of performing downlink scheduling.

Suppose user u is attached to BS j in the hexagon of player i when player i plays $s_i$, and the same user is attached to BS k when player i plays $s_i'$, where BS k is not necessarily in the hexagon of player i. At this point, user u must be rescheduled to some PRBs offered by BS k, otherwise $V_j(s_i', s_{-i})$ becomes minus infinity. Such an outcome will prevent a player from changing its CSB values, which does not fulfill our objective of CSB optimization. Also, the PRBs that are assigned to user u when player i plays $s_i$ becomes unused when player i plays $s_i'$. These unused PRBs can be assigned to other users in order to improve the payoff function of player i. Therefore, it is necessary for a strategy of player i to provide not only the scheduling of the BSs in player i but also the scheduling of BSs in $N_i^{Att}$, so that a strategy that changes user attachment patterns can have the chance of being a best/better response.

Let $$\Gamma_\varphi^{eICIC} \triangleq \langle \mathcal{L}, \{S_i^{eICIC}: i \in \mathcal{L}\}, \{V_i: i \in \mathcal{L}\} \rangle$$

be the exact potential game for eICIC optimization using scheduler φ, where $S^i$eICIC denotes the set of strategies of player i when eICIC optimization is performed. We have $$S_i^{eICIC} = \mathcal{A} \times \underbrace{C \times C \times \ldots \times C}_{|i|-1 \text{ times}} \times \varphi(\mathcal{N}_i^{Att}), \quad (24)$$

where |i| is the number of BSs in the hexagon of player i, |i|−1 is the number of pico BSs in in the hexagon of player i, and $\varphi(N_i^{Att})$ gives the scheduling decision of the BSs in $N_i^{Att}$ using scheduler φ.

The best response dynamics solves an exact potential game by iteratively finding the strategies that maximize the payoff functions of the players selected in each iteration. From the definition in (24), we can see that the size of the strategy set for eICIC optimization scales up quickly as the number of pico BSs in a hexagon increases. In order to reduce the complexity in each iteration of the best response dynamics, we use better response dynamics where only one pico BS's CSB value will be optimized in each iteration. Although, in general, better response dynamics cannot improve the payoff function of a player as much as best response dynamics does, better response dynamics also reaches a Nash equilibrium. We therefore propose the following eICIC optimization algorithm based on exact potential game formulation:

I-1. Randomly select a player i from L.
I-2. Randomly select a pico BS p in the set of BSs represented by player i.
I-3. Denote the macro BS in the hexagon of player i as m. For all possible elements in A×C, perform scheduling for all BSs in $N_i^{Att}$ using scheduler φ and evaluate $V_i$. Select the element in A×C that maximizes
I-4. Repeat the above steps until some stopping criterion is met.

The objective function in MaxPfUtility-I will be improved when the above better response dynamic is carried out, because the aggregate utility of $\Gamma^{eICIC}$ improves as a result of improved payoff function of each selected player during the better response dynamic. Therefore, the steps I-1 to I-4 optimize MaxPfUtility-I heuristically.

B. The Strategy Sets and the Algorithm for FeICIC

Similar to the eICIC optimization, the strategy of a player should contain the RP-ABS pattern of the macro BS in the selected player, the CSB pattern of a randomly selected pico BS in the hexagon of the selected player, and the scheduling decision of the BSs in $N_i^{Att}$. On the other hand, because in FeICIC optimization, the transmission power level in a RP-ABS can take a fractional value, it is impossible to exhaustively search all possible transmission power levels for each RP-ABS.

Let τ(b) ∈ Å, and assume that macro BS m belongs to player i which is chosen to perform FeICIC optimization. Let u be the index of the user who occupies PRB b from macro BS m, and let $U_{m,b}^{IF}$ be the set of users who are interfered by the transmission of macro BS m and who are using the b-th PRBs offered by their respective serving BSs. Fixing macro BS m's transmission power on PRBs other than b, we optimize macro BS m's transmission power on PRB b by solving the following problem PowerAllocation $$\operatorname*{maximize}_{\hat{\alpha}_m(b)} w_u \ln(\log_2(1 + SINR_{u,b}^m) + r_u^{-b}) + \quad (25)$$

$$\sum_{v \in \mathcal{U}_{m,b}^{IF}} [w_v \ln(\log_2(1 + SINR_{v,b}^j) + r_v^{-b})],$$

subject to $0 \leq \hat{\alpha}_m(b) \leq 1$, (26)

where $r_u^{-b}$ gives user u's rate obtained from PRBs other than b in case user u has been allocated to more than one PRB and $$SINR_{v,b}^j = \frac{h_{v,b}^j \cdot P_{j,v,b}^{Rx}}{\hat{\alpha}_m(b) \cdot P_{m,v}^{Rx} + P_{I_p \setminus \{m\}, v, b}^{IF} + N_0 \cdot W}, \quad (27)$$

where $P_{j,v,b}^{Rx}$ is the received signal power of user v at PRB b from its serving BS j and $p_{m,v}^{Rx}$ gives the interference power from macro BS m to user v when macro BS m is transmitting at its maximum power. Note that the index j in (27) is an element from $N_i$, where i is the index of the chosen player. Also, without loss of generality, we assume that $P_{j,v,b}^{Rx} \neq 0$, since we can remove user v from $UIF_{m,b}$ if $P_{j,v,b}^{Rx} = 0$.

The objective function of PowerAllocation is chosen to be in line with the objective function of MaxPfUtility-II so that when PowerAllocation is optimized the objective function of MaxPfUtility-II will also increase. Also, all variables in PowerAllocation are known except $\hat{a}_m(b)$. The next theorem shows the nature of the objective function of PowerAllocation.

Theorem 3 Equation (25) is the difference between two convex functions, where the two convex functions are $\Sigma_{v \in \mathcal{U}_{m,b}^{IF}}[w_v \ln(\log_2(1+SINR_{v,b}^j)+r_v^{-b})] - w_u \ln(\log_2(1+SINR_{u,b}^m)+r_u^{-b})$.

Proof. See Appendix D.

Because of Theorem 3, POWERALLCATION can be solved by the convex-concave procedure (CCP) which converges to a stationary point [21]. Let $\Phi_1(\hat{\alpha}_m(b)) \triangleq w_u \ln(\log_2(1+SINR_{u,b}^i)+r_u^{-b})$ and $\Phi_2(\hat{\alpha}_m(b)) \triangleq \Sigma_{v \in \mathcal{U}_{m,b}^{IF}}[w_v \ln(\log_2(1+SINR_{v,b}^j)+r_v^{-b})]$ Also, denote $\hat{\alpha}_m^\zeta(b)$ as the value of $\hat{\alpha}_m(b)$ in the ζ-th iteration in the CCP. The CCP algorithm is described in Algorithm 1:

---

Algorithm 1
Convex-concave procedure (CCP)

---

1: ζ := 0, give $\hat{\alpha}_m^\zeta(b)$ an initial value from the interval [0, 1].
2: repeat
3:   Define $\hat{\phi}_2(\hat{\alpha}_m(b), \hat{\alpha}_m^\zeta(b)) \triangleq \phi_2(\hat{\alpha}_m^\zeta(b)) + \phi_2'(\hat{\alpha}_m^\zeta(b))(\hat{\alpha}_m(b) - \hat{\alpha}_m^\zeta(b))$.
4:   Set the value of $\hat{\alpha}_m^\zeta(b)$ to be the solution of the following problem $$\operatorname*{minimize}_{\hat{\alpha}_m b} -\phi_1(\hat{\alpha}_m(b)) - \hat{\phi}_2(\hat{\alpha}_m(b), \hat{\alpha}_m^\zeta(b)),$$

subject to $0 \leq \hat{\alpha}_m(b) \leq 1$.

-continued

Algorithm 1
Convex-concave procedure (CCP)

5:     $\zeta := \zeta + 1$.
6: until some stopping criterion is met.
where
$\phi_2'(\hat{\alpha}_m(b))$ is the first derivative of $\phi_2$ w.r.t $\hat{\alpha}_m(b)$ and it is given n (28):

$$\phi_2'(\hat{\alpha}_m(b)) = -\sum_{\upsilon \in \mathcal{U}_{m,b}^{IF}} \frac{\rho_{1,\upsilon}\rho_{2,\upsilon}w_\upsilon}{(\rho_{2,\upsilon}\hat{\alpha}_m(b) + \rho_{3,\upsilon})(\rho_{2,\upsilon}\hat{\alpha}_m(b) + \rho_{3,\upsilon} + \rho_{1,\upsilon})} \cdot \left(\ln\left(1 + \frac{\rho_{1,\upsilon}}{\rho_{2,\upsilon}\hat{\alpha}_m(b) + \rho_{3,\upsilon}}\right) + \ln(2)r_\upsilon^{-b}\right) \quad (28)$$

where $\rho_{1,\upsilon} \triangleq h_{u,b}^i P_{j,u,b}^{Rx}, \rho_{2,\upsilon} \triangleq P_{m,u}^{Rx}$, and $\rho_{3,\upsilon} \triangleq P_{I_p \setminus \{m\}, u, b}^{IF} + N_0 W$.

Note that step 4 in Algorithm 1 involves solving a convex problem which can be easily solved by standard software tools.

We are now ready to describe the FeICIC optimization algorithm based on the exact potential game formulation:

II-1. Randomly select a player i from L. Denote the macro BS in player i as m.
II-2. Randomly select a pico BS p from the set of BSs represented by player i.
II-3. For each possible CSB values of pico BS p,
  (a) Perform scheduling for all stations in $N_i^{Att}$ using scheduler φ, assuming that it transmits at full power on all PRBs.
  (b) For each element in $\{b | \tau(b) \in \hat{A}\}$, perform power optimization on macro BS m's transmission power by solving POWERALLOCATION.
  (c) Perform scheduling for all stations in $N_i^{Att}$ using the scheduler φ and evaluate $V_i$.
II-4. Select the strategy of player i that maximizes
II-5. Repeat the above steps until some stopping criterion is met.

The steps II-1 to II-5 optimize MAXPFUTILITY-II heuristically, because the aggregate utility of $\Gamma^{FeICIC}$ improves as the game is being played.

C. Implementation in Practice

In LTE-A systems, a user's association is determined by the received signal strength and the offset value (i.e., CSB value in our context) from each of the candidate BSs. The offset values are stored in the system information blocks (SIBs) which are defined and broadcast to the users by the evolved universal terrestrial radio access network (E-UTRAN), i.e., by the BSs [22, Chapters 2 and 3]. A user continuously measures the channel conditions of its nearby BSs and reports these measurements to its serving BS. When a BS offers ABSs, a user served by the BS may find if a nearby pico BS has a better channel condition than its serving BS. Such information can be utilized by the serving BS to decide whether the CSB values should be updated so that a handover can be performed.

After accessing the interference situation of its users, a BS may request a neighboring BS for ABSs using an "Invoke Indication" message via the X2 interface. The BS that receives such a request may then configure its ABS pattern and inform its neighboring BSs such that the latter may perform scheduling based on the new ABS pattern [22, Chapter 31]. Also, BSs can adjust and coordinate the ABS patterns based on the "ABS Status" messages exchanged among them.

We can see that the LTE-A standards have prescribed signalling that allows FeICIC/eICIC optimizations to be carried out in a distributed manner. Via the signalling from neighboring BSs and the measurement reports from the users, A BS is able to know the interference situations of its users and the users served by nearby BSs. A BS can then decide how to adjust ABS/RP-ABS and CSB patterns for performance optimization.

The realization of the distributed optimizations is a design issue which is not standardized. Our proposed game theoretic framework provides distributed algorithms for eICIC/FeICIC optimizations and can be supported by the existing LTE-A standards. More specifically, the better response dynamics for eICIC/FeICIC optimizations are in the spirit of distributed optimization, since each player uses only local information to drive the overall system to optimality. In particular, each player is able to evaluate the impact of his strategy on his neighboring player's utilities. All this is possible thanks to the availability of the aforementioned signalling over the X2 interface.

VI. DOWNLINK SCHEDULERS

We now present the downlink schedulers that can be the potential candidates for φ.

A. Round-Robin (RR) Scheduler

When using the RR scheduler, the available PRBs of a BS are allocated to the associated users in turns. For example, suppose a BS has five available PRBs labelled as $PRB_1$, $PRB_2, \ldots$, and $PRB_5$, and two users are associated with the BS, then user 1 will get $PRB_1$, $PRB_3$, and $PRB_5$, and user 2 will get $PRB_2$ and $PRB_4$. Note that a macro BS's PRBs that are ABSs will not be allocated to any user.

B. PF Scheduler

The b-th PRB of a BS will be allocated to the following user [22]:

$$\hat{u}_b \triangleq \arg\max_{u \in \mathcal{U}_i} \frac{r_{u,b}}{\bar{r}_u(\tau(b))}, \quad (29)$$

where $\tau(b)$ gives the subframe index of the b-th PRB and the underlying assumption is that subframe $\tau(b)$ is not an ABS, $b \in [1, N_B]$, and $\bar{r}_n(t)$ is the long-term average throughput of user u in subframe $\tau(b)$ which is calculated as:

$$\bar{r}_u(\tau(b)) = \left(1 - \frac{1}{t_c}\right)\bar{r}_u(\tau(b) - 1) + \frac{1}{t_c}\sum_{\{\tilde{b}|\tau(\tilde{b})=\tau(b)\}} r_{u,\tilde{b}} \cdot 1\{\hat{u}_{\tilde{b}} = u\}. \quad (30)$$

In (30), $t_c$ is the time window which is a design parameter and $1\{\cdot\}$ is the indicator function. The performance of this scheduler has been evaluated in several scenarios; see [23].

C. Convex Scheduler

Given a strategy of player i, we wish to maximize the utility function of the players in $N_i$ as defined in (17) subject to the constraints (5), (6) and (7). This problem is the same as PRB-Allocation and it is, unfortunately, NP-hard as stated in Theorem 1.

On the other hand, we can relax the binary constraint in PRB-Allocation to reduce the complexity of solving the problem. For example, considering pico BS p, we can relax the integer constraint in (7) and formulate the following problem:

PRB-Allocation-Relaxed $$\text{maximize} \sum_{u \in \mathcal{U}_p} \left| w_u \cdot \ln \sum_{b=1}^{N_B} (\widetilde{x_{u,b}} \cdot r_{u,b}), \right. \quad (31)$$

subject to $$0 \leq \widetilde{x_{u,b}} \leq 1, \forall u \in \mathcal{U}_p, b \in [1, N_B], \quad (32)$$

$$\sum_{u \in \mathcal{U}_p} \widetilde{x_{u,b}} = 1, b \in [1, N_B]. \quad (33)$$

In PRB-Allocation-Relaxed, $\tilde{x}_{u,b}$ represents the fraction of PRB b allocated to user u. We make the following observations:

(a) The objective function of PRB-ALLOCATION-RELAXED is concave. To see this, notice that ln $\sum_{b=1}^{N_B}(\widetilde{x_{u,b}} \cdot r_{u,b})$ is a concave function of a linear combination of $\{\widetilde{x_{u,b}} | b \in [1, N_B]\}$. Therefore, the objective function of RELAXEDALLOCATION is also concave because it is a nonnegative summation of concave functions [24].

(b) The constraints of PRB-ALLOCATION-RELAXED are linear.

As a result, PRB-ALLOCATION-RELAXED is a concave optimization problem, and it can be solved by using standard convex optimization solvers. Let the matrix $X^{Relaxed}$ be the solution to PRB-ALLOCATION-RELAXED, where its (u,b)-th entry, $X_{u,b}^{Relaxed}$, gives the fraction of the b-th PRB that is allocated to user u. To get an allocation pattern that satisfies the constraints of MAXPFUTILITY, we need to quantize $X^{Relaxed}$. Also, we need to make sure that every user gets at least one PRB after quantization, because the utility function defined in (17) evaluates to minus infinity if no PRB is allocated to any of the users, which contradicts with the goal of trying to maximize the utility function. The quantization can be done in the following steps:

1. For each column of $X^{Relaxed}$, set the largest element in the column to one and other elements to zeros. Denote the resultant matrix as $X^{Quan.}$.
2. If there exists a zero row in $X^{Quan.}$:
   (a) Denote all columns of $X^{Quan.}$ as free columns.
   (b) Randomly select a zero row in $X^{Quan.}$, e.g., row u.
   (c) Let $X_{u,b}$ be the largest element in row u of $X^{Relaxed}$ where column b is still a free column in $X^{Quan.}$. Set $x_{u,b}^{Quan.}$ to one and every other element in column b of $X^{Quan.}$ to zeros.
   (d) Remove column b from the free column list. Repeat steps b) and
   c) if there still exists a zero row in $X^{Quan.}$.

The above quantization ensures that the constraints of ALLOCATION, i.e., (14) and (15), are satisfied, and each user gets at least one PRB.

The scheduler for a macro BS is similar and therefore its details are omitted for brevity. The only difference is that PRBs that are configured as ABSs are not allocated to any user.

D. Cake-Cutting Scheduler

We now present a method that solves the PRB-ALLOCATION-RELAXED problem. We use the fact that the solution to PRB-ALLOCATION-RELAXED leads to a price equilibrium to the following PRICEEQUILIBRIUM problem [25, Chapter 8.5]:

PRICEEQUILIBRIUM.

Let $r_{u,b}$ be nonnegative real numbers, where $u \in U_i$, $b \in [1. N_B]$. The real vector $(v_1, v_2, \ldots, v_{N_B})$ is called an equilibrium price vector and the nonnegative real vectors $\{(\widetilde{x_{u,1}}, \widetilde{x_{u,2}}, \ldots, \widetilde{x_{u,N_B}}) | u \in u_i\}$ are called equilibrium bundles, if $$\sum_b v_b = \sum_u w_u, \quad (34)$$

$$\{\widetilde{x_{u,b}} | \forall b\} \text{ maximize } \sum_b (\widetilde{x_{u,b}} \cdot r_{u,b}), \forall u, \quad (35)$$

subject to $\sum_b v_b \cdot \widetilde{x_{u,b}} \leq w_u, \forall u, \quad (36)$ $$\sum_u \widetilde{x_{u,b}} = 1, \forall b. \quad (37)$$

The intuition for PRICEEQUILIBRIUM is as follows. There are $N_B$ goods in the market each with price $v_b$, where $b \in [1, N_B]$. User u has budget $w_u$ and he is allowed to buy a nonnegative portion of any good. $r_{u,b}$ gives the utility of the b-th good to user u. A price equilibrium is the set of prices of the goods so that all users spend all their budgets, all goods are sold out, and under these conditions all users maximize their own utilities.

Let $\{x_{u,b}^* | \forall_{u,b}\}$ be the solution to PRB-ALLOCATION-RELAXED. It is proved in [18] that a price equilibrium of PRICEEQUILIBRIUM gives an optimal solution to PRB-ALLOCATION-RELAXED.

Theorem 4. A solution of PRICEEQUILIBRIUM gives an optimal solution to PRB-ALLOCATION-RELAXED.

Proof. See [18].

The PRICEEQUILIBRIUM problem can be solved by the algorithm proposed in [26]. The algorithm works by iteratively adjusting the prices of the goods and assumes that a user only buys the goods that have the largest utilities to him. Each iteration of the algorithm involves solving a max flow problem in a single-source single-sink directed graph where the edges are weighted, and therefore an iteration takes polynomial time.

The algorithm terminates within finite iterations, though [26] does not provide an upper bound on the number of iterations. In the simulation section, we will compare the run time of the cake-cutting PF scheduler to that of the convex PF scheduler.

VII. SIMULATION RESULTS

We perform simulation studies on FeICIC and eICIC optimizations by randomly generating 100 HetNet topologies and then averaging the performance indicators from all the topologies. In the center cluster of each topology, a number of pico BSs and 20 users are placed inside each hexagon in the center cluster, where the pico BSs are randomly placed. Moreover, in each hexagon in the center cluster, 10 users are randomly placed within 100 meters of the pico BSs in the same hexagon (If there exists more than one pico BS, then the 10 users are equally divided into a number of groups which is the same as the number of pico BSs, and one and only one group of users are randomly placed near a pico BS). The distances between different BSs and the distances between BSs and users are constrained by the minimum distance requirements as specified in Table II.

TABLE II

Parameters for generating HetNet topologies [27].

| Parameter | Value |
| --- | --- |
| Inter-macro-BS distance | 1000 m |
| Minimum distance from macro BS to user | 35 m |
| Minimum distance from pico BS to user | 10 m |
| Minimum distance from macro BS to pico BS | 75 m |
| Antenna per site | Omnidirectional × 1 |
| Macro BS power | 40 W |
| Pico BS Power | 1 W |
| Noise density | −174 dBm/Hz |
| Noise figure | 9 dB |
| Duration per subframe | 1 ms |
| Bandwidth per RB | 180 kHz |
| CSB values | C:={0, 3, 6, 9, 12, 15} dB |
| Log-normal shadowing standard deviation | 10 dB |
| Path loss from macro BS to user | 128.1 + 37.6 $\log_{10}$d, d in km |
| Path loss from pico BS to user | 140.7 + 36.7 $\log_{10}$d, d in km |

The six surrounding clusters of the center cluster are exact copies of the center cluster. Other parameters regarding the generation of a random HetNet are also shown in Table II. We assume that the users are static. Also, each PRB experiences independent Rayleigh fading with variance 1. The shadow fading in dB from a BS to a user is calculated by adding a common shadowing value and a random shadowing value and then dividing the sum by $\sqrt{2}$, where both shadowing values are generated according to log-normal distribution [27] (this is to create correlations among shadow fading).

The parameters of the problems MAXPFUTILITY-I and MAXPFUTILITY-II for simulations are configured as follows. The weighting factors of all users are set to be 1, i.e., $w_u$=1 for all u. $N_T$ is set to be 10 and $N_F$ is set to be 3. FIG. 4B shows all the possible ABS patterns. Also, the CSB values a pico BS can adopt are given in Table H. For conciseness, in the rest of the figures, we use "Nil" to represent the case where neither eICIC nor FeICIC is carried out, "Exact" to represent the case where $N_i^{IF}$=i∪N(i,1), and "Non-exact" to represent $$N_i^{IF}=i\cup N(i,1)\cup N(i,2)\cup N(i,3)$$

Moreover, we use the terms cell and hexagon interchangeably.

Figure 4C:
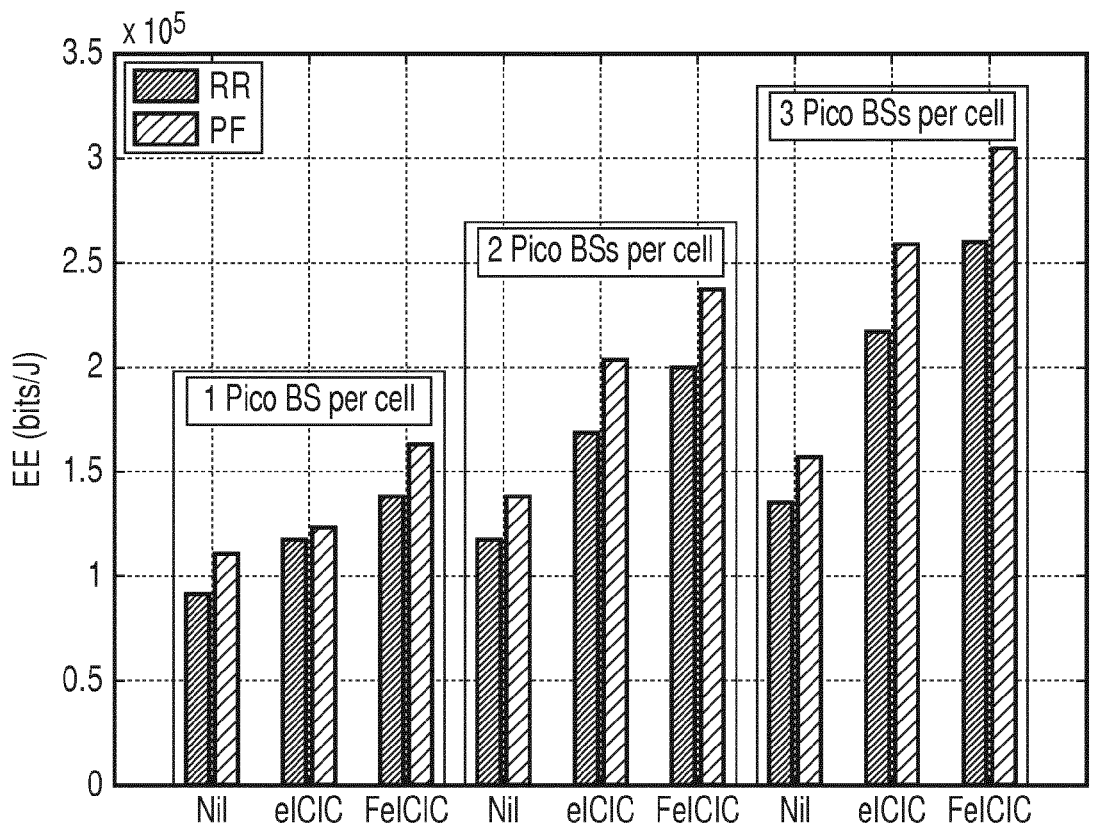
FIG. 4C illustrates the EE of the center cluster for various topology settings.

FIG. 4C shows the EE of different optimization schemes in the center cluster, where the EE is calculated as the number of transmitted bits divided by the transmission energy. We can see that eICIC optimization largely improves the EE and FeICIC optimization further enhances the EE. Specifically, when the PF scheduler is used and there are three pico BSs in each hexagon, eICIC can offer about 64% improvement compared to the no-optimization case and FeICIC can offer about 92% compared to the no-optimization case. Moreover, compared to the no-optimization case, eICIC and FeICIC can offer more gain on EE when there are more pico BSs in each hexagon.

Figure 4D:
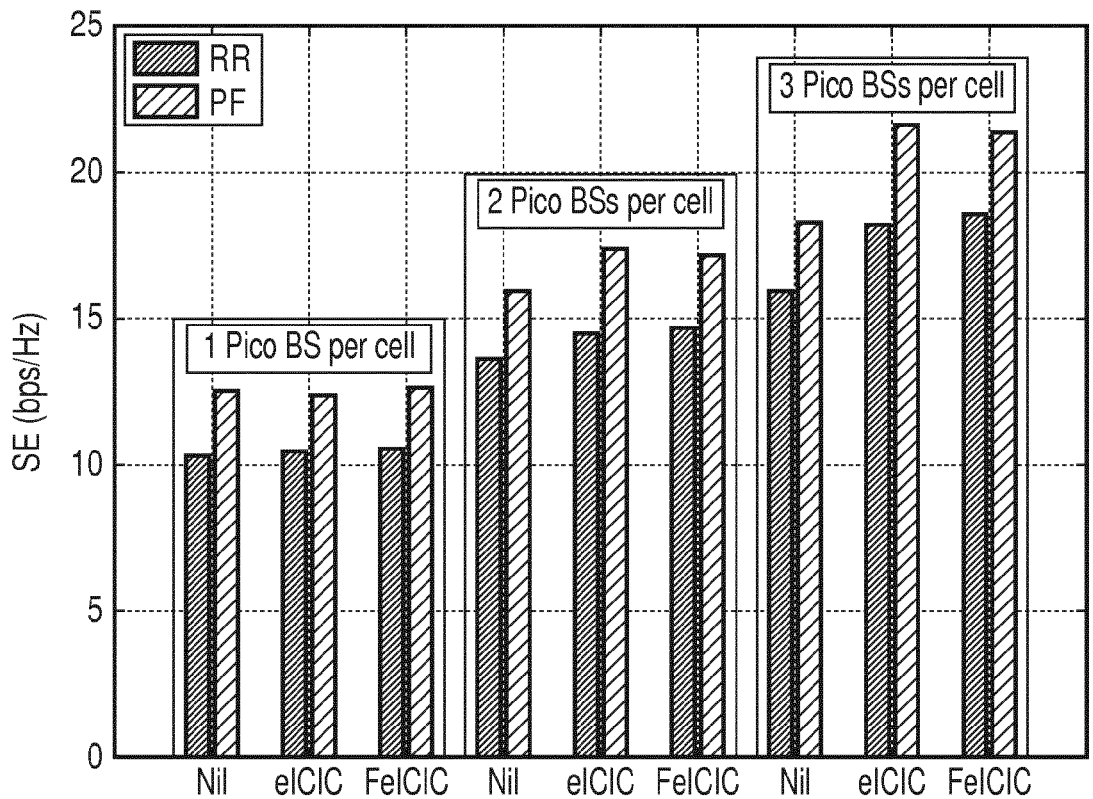
FIG. 4D illustrates the SE of the center cluster for various topology settings.
Figure 4E:
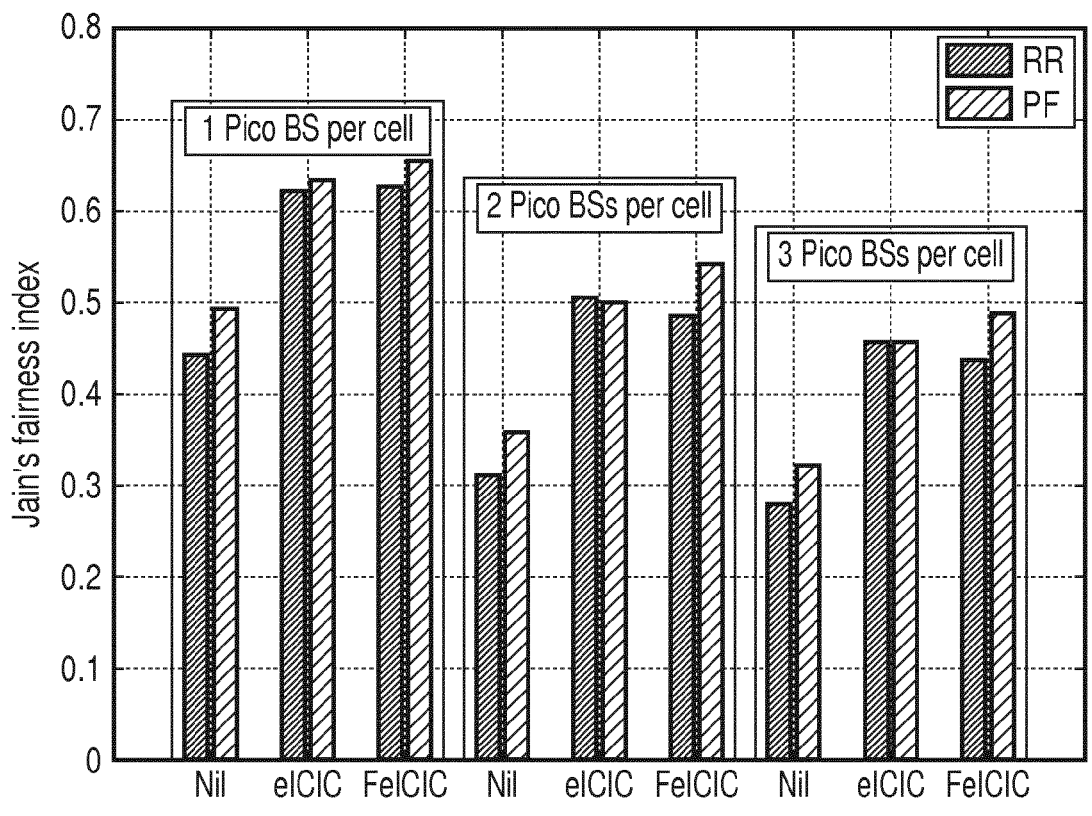
FIG. 4E illustrates Jain's fairness indices of the users' achieved rates in the center cluster for various topology settings.

FIG. 4D shows the SE of different optimization schemes in the center cluster, where the SE is defined as the average per-bandwidth capacity of all allocated PRB. Although the SE after FeICIC optimization using PF scheduler may be slightly (around 1% in general) less than the SE after eICIC optimization, FeICIC should still be treated as a better scheme than eICIC optimization because compared to eICIC optimization, FeICIC optimization offers significant gain on EE, offers better fairness when PF scheduler is used as shown in FIG. 4E, and offers better worst 5% user's achieved rates as shown in FIG. 4F.

Figure 4F:
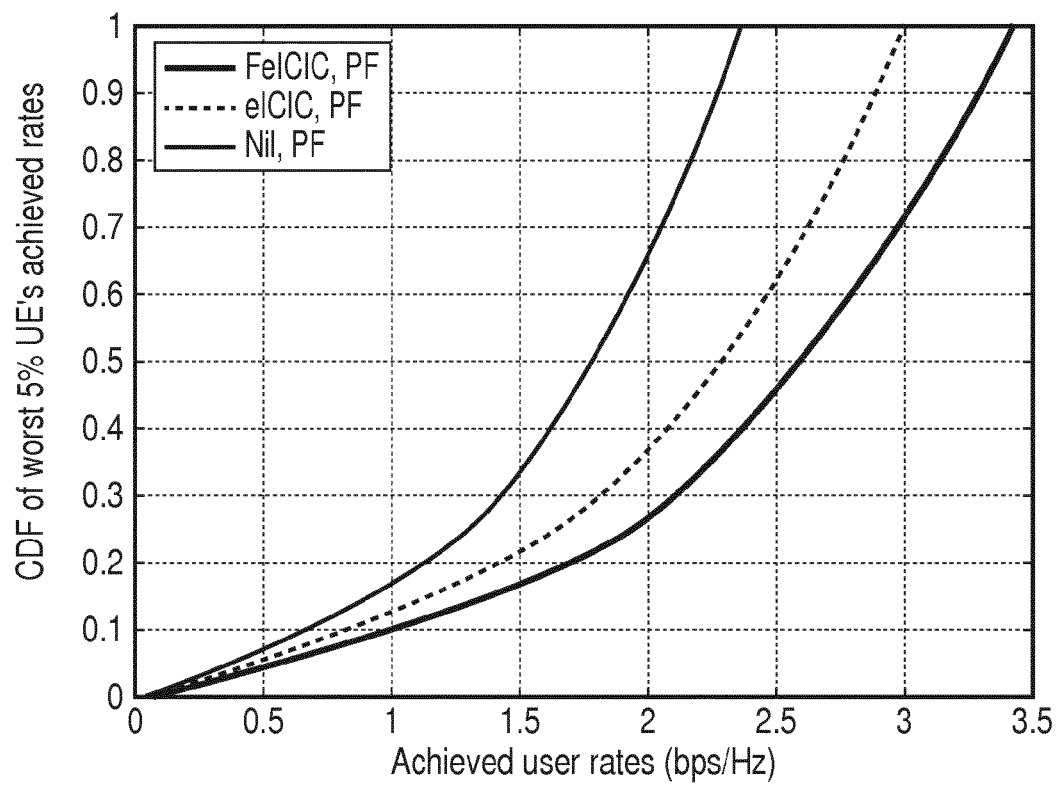
FIG. 4F illustrates the cumulative distribution function (CDP) of the worst 5% users' achieved rates in the center cluster, where the PF scheduler is used and each hexagon has one pico BS.

FIG. 4F plots the cumulative distribution function (CDF) of the users' achieved rates which are in the worst 5% range of all users' achieved rates (this is also commonly referred to as the cell-edge throughput), where the PF scheduler is used and each hexagon has one pico BS. We can see that eICIC optimization can improve the median value of the worst 5% users' achieved rates by about 30%, and FeICIC can further improve the median value by about 15%.

Figure 4G:
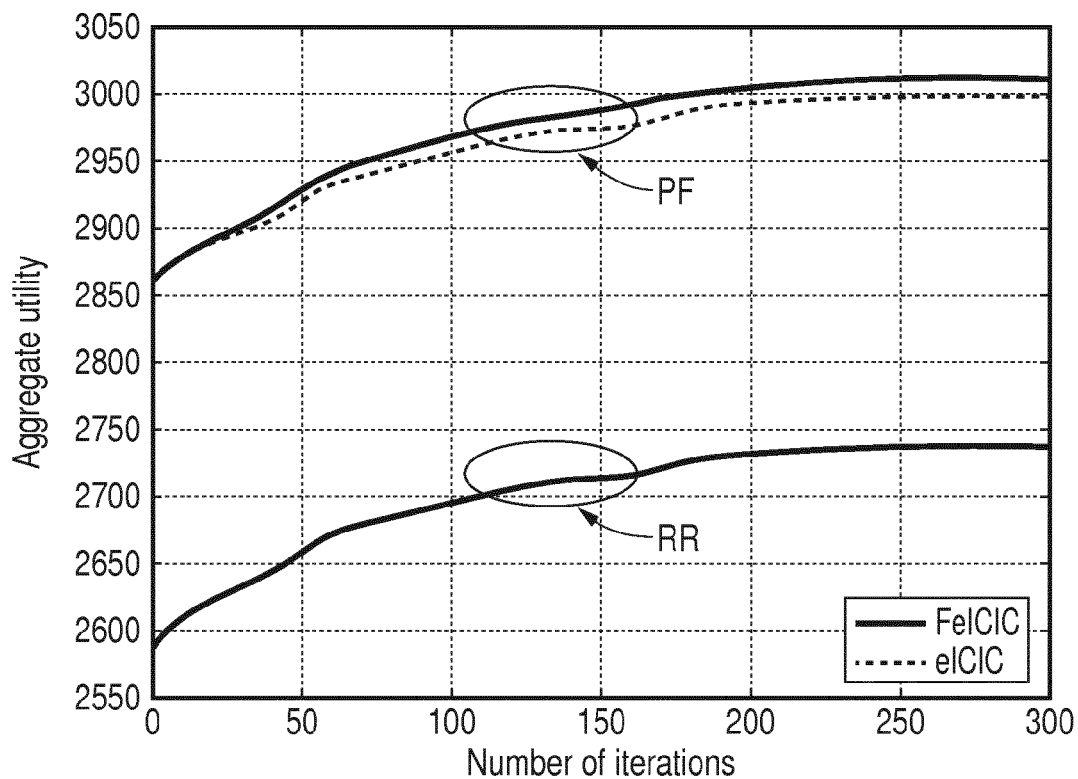
FIG. 4G illustrates aggregate utilities of the games $\Gamma^{FeICIC}$ and $\Gamma^{eICIC}$, where there are 3 pico BSs in each hexagon.

FIG. 4G plots the averaged global utilities of the games $\Gamma^{FeICIC}$ and $\Gamma^{eICIC}$ when both RR and PF schedulers are used, where three pico BSs are placed in each hexagon. We can see that the better response dynamics proposed in Sections V-A and V-B can optimize the problems MAXPFUTILITY-I and MAXPFUTILITY-II heuristically because the global utilities increase as the games are being played.

The results in FIG. 4C to FIG. 4G are obtained when player i only interferes near-by users, i.e., $N_i^{IF}$=∪N(i,1). In reality, however, the interference from a BS can reach further. Suppose we count the interference from BSs in $\cup_{n=0}^{4} N(m_u,n)$ to user u as all the interference user u suffers from, where no ABS/RP-ABS or CSB is applied. Table III summarizes the averaged interference power to a user from the neighboring cells.

TABLE III

Average interference to user u from neighboring BSs.

| | N ($m_{u,0}$) ∪N ($m_{u,1}$) | N ($m_{u,2}$) | N ($m_{u,3}$) | N ($m_{u,4}$) |
| --- | --- | --- | --- | --- |
| Interference Power (dB) | −106.59 | −122.42 | −124.70 | −128.17 |
| Percentage | 95.38% | 2.49% | 1.47% | 0.66% |

The definition of Nip i ∪ N (i,1) takes 95.38% of the total interference into account.

To see the impact of interference approximation, we compare the performance of the game theoretic optimization schemes when $N_i^{IF}$=∪N(i,1) and $N_i^{IF}$=i ∪ N (i,1)i ∪ N(i,2) ∪ N(i,3), where i is a player in the games $\Gamma^{FeICIC}$ and $\Gamma^{eICIC}$.

Note that when $N_i^{IF}$=i ∪ N (i,1)i ∪ N(i,2)i ∪ N(i,3), the games $\Gamma^{FeICIC}$ and $\Gamma^{eICIC}$ will no longer be exact potential games because (22) is no longer true. For the scenario where there are two pico BSs in each hexagon, we plot the EE, the SE, and the Jain's fairness indices after FeICIC optimization in FIG. 4H, FIG. 4I, and FIG. 4J, respectively, where in those figures, "Exact" represent the case when $N_i^{IF}$=i ∪ N (i,1) and "Non-exact" represent the case when $N_i^{IF}$=i ∪ N (i,1)i ∪ N (i,2)i ∪ N(i,3). We can see that although the performances of the optimization schemes are over-estimated by the assumption of $N_i^{SF}$=∪N(i,1), the performance gains achieved by FeICIC compared to the no-optimization case is accurately predicted.

Figure 4H:
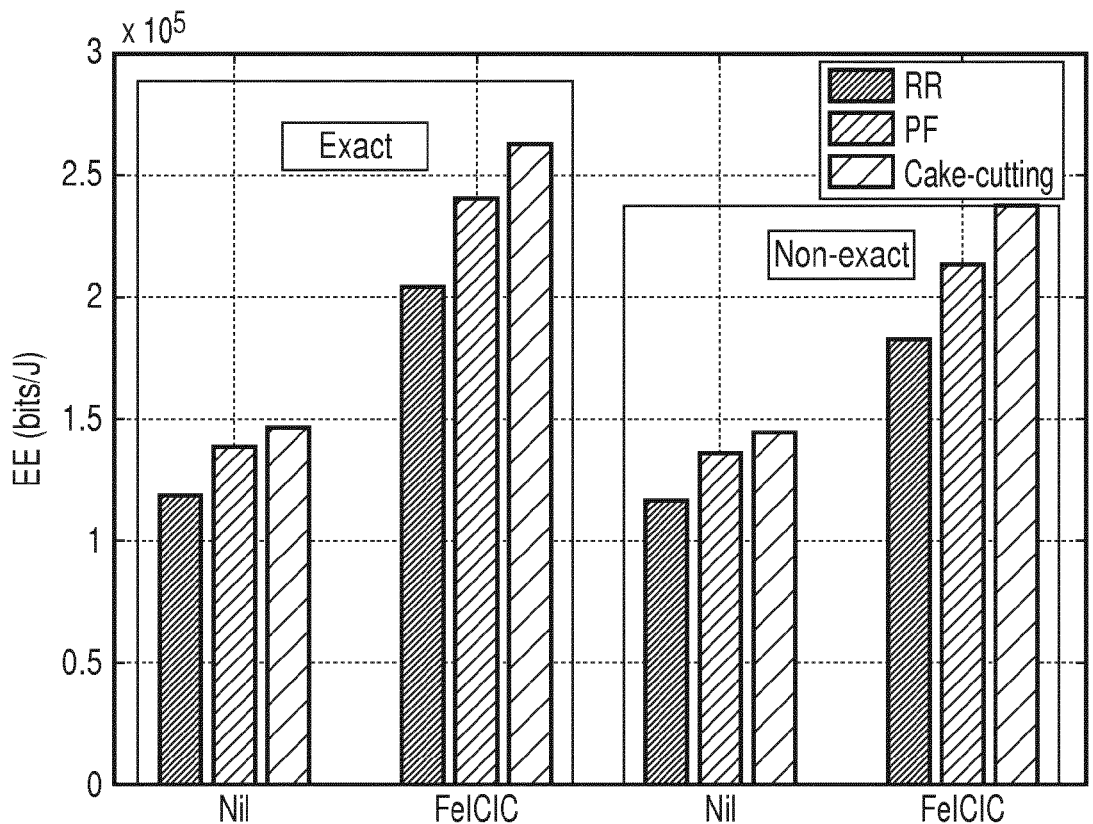
FIG. 4H illustrates the EE when there are two pico BSs in each hexagon.
Figure 4I:
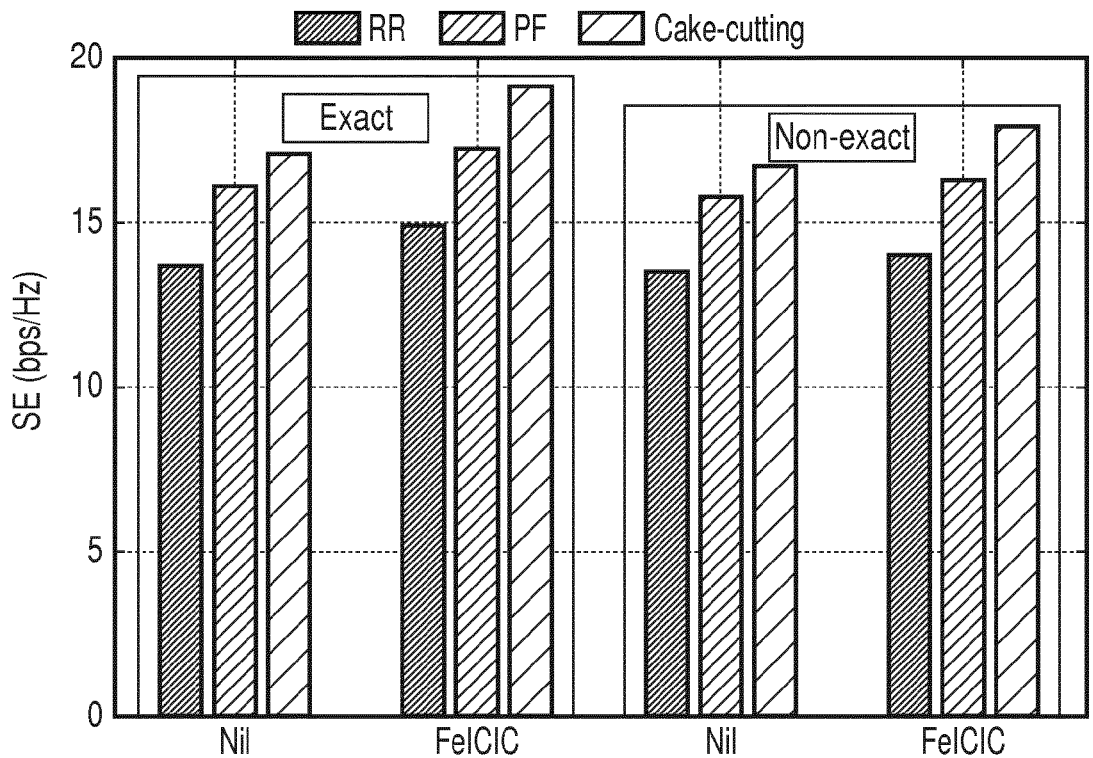
FIG. 4I illustrates the SE when there are two pico BSs in each hexagon.
Figure 4J:
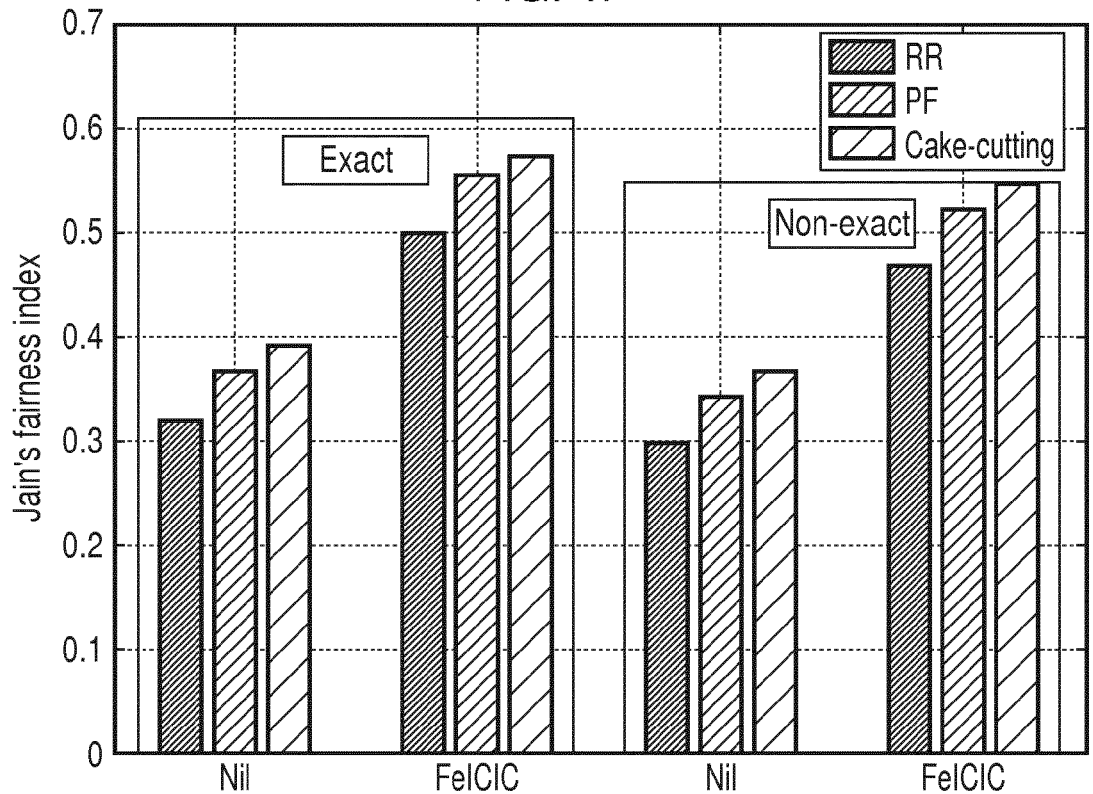
FIG. 4J illustrates the Jain's fairness indices of users' achieved rates when there are two pico BSs in each hexagon.

The performance of the cake-cutting scheduler is compared with RR scheduler and PF scheduler in FIG. 4H, FIG. 4I, and FIG. 4J. We can observe that the cake-cutting scheduler can lead to better performance on EE, SE, and fairness compared to the other schedulers. Specifically, when FeICIC is performed, the cake-cutting scheduler has approximately an 11% gain on EE and approximately a 10% gain on SE.

Table IV shows the average MATLAB simulation run time for each macro BS to perform downlink scheduling using different schedulers, where it is assumed that no pico BS is present and each macro BS serves exactly 10 users.

TABLE IV

Comparison on downlink schedulers' run time.

| Scheduler | Average Run Time per BS |
|---|---|
| Convex | 7.5275 seconds |
| Cake-cutting | 0.3860 seconds |
| PF $t_c$= 5 | 0.0045 seconds |
| RR | 0.0018 seconds |

The MATLAB version is R2013a, and the simulation is performed on a laptop equipped with an Intel i5-4200U CPU using single thread. For the convex scheduler, we compare all the four available convex solvers in MATLAB's built-in function "fmincon", and we record the run time of the fastest solver. However, the averaged run time of the convex scheduler using sqp algorithm in the "fmincon" function is about 20 times as long as that of the cake-cutting scheduler. Although the PF scheduler and the RR scheduler run faster than the cake-cutting PF scheduler, the cake-cutting scheduler gives better performance in terms of EE, SE, and fairness in users' achieved rates.

VIII. CONCLUSION

In this disclosure, we have proposed distributed algorithms based on the exact potential game framework to optimize FeICIC and eICIC in LTE-A HetNets. Through simulation studies, we have demonstrated that eICIC optimization can improve the EE of the network by 64% while FeICIC optimization can improve the EE by about 92%. In addition, FeICIC can offer better fairness in users' throughputs and can also yield significant cell-edge throughput gains compared to eICIC. Furthermore, we have shown that a cake-cutting algorithm can be used as a downlink scheduler to offer better EE, SE, and fairness among users compared to conventional PF schedulers while being much more computationally efficient than the conventional convex-solvers.

APPENDIX A

Proof of Proposition 1

Given a user u:

1. Suppose $m_u$=j, where j ∈ i, then user u can be associated with any BSs in $O_u$=i ∪ N(i, 0) ∪ N(i,1) for any CSB values that the pico BSs represented by player i takes.

2. Suppose $m_u$∈N(i,1) and $g(u,\gamma_{O_u})$=j, where j ∈ i. If we change $\gamma_{O_u}$(j), then:

(a) Depending on the CSB value of BS i, user u can be associated with a BS in N(i,2) because N(i,2)∩$O_u$≠∅ and i⊂$O_u$.

(b) User u cannot be associated with any BS in N(i,x), where x≥3. The reason is that N(i,x)∩$O_u$=∅, for x≥3.

3. Suppose $n_u$∈N(i,x), where x≥2. In this case, the change of CSB values of player i will not affect the association of user u because player i is not in $O_u$.

Summarizing the above three scenarios, we can conclude that $N_i^{Att}$=i ∪ N (i,0)i ∪ N (i,1)i ∪ N (i,2).

APPENDIX B

Proof of Proposition 2

Suppose player i changes its strategy from $s_i$ to $s'_i$. We can easily see that if the difference between $s_i$ and $s'_i$ includes the scheduling decision, then the scheduling change will only affect $U_i$. Therefore, we can decouple the effect of scheduling change and the following three cases are sufficient to determine which players' utility functions will be affected:

C-1. If $s_i$ and $s'_i$ differs by the ABS/RP-ABS pattern only, then users who are located in the same hexagons as BSs in $N_i^{IF}$ will have their achieved rates changed, while these users can be attached to BSs in i∪N(i,1)∪N(i,2)=$N_i^{Att}$. Therefore, utilities of players in $N_i^{Att}$ may be changed in this case.

C-2. If $s_i$ and $s'_i$ differs by the CSB patterns only, and consequently user u's serving BS is changed from n to j, then the utilities of the players where BS n and BS j belong to will be changed and $m_u$∈i∪N(i,1). Moreover:

(a) If $m_u$⊂i, then n∈$O_u$⊂$N_i^{Att}$ and j⊂i∪N(i,1)⊂$N_i^{Att}$.

(b) If $m_u$⊂N(i,1), then {n,j}∈$O_u$⊂i∪N(i,1)∪N(i,2)

In other words, {n,j}∈$N_i^{Att}$.

C-3. Suppose $s_i$ and $s'_i$ differs by both the ABS/RP-ABS and the CSB patterns, and consequently user u's serving BS is changed from n to j. From the analysis of C-1, we know that users who are interfered by player i can only be attached to BSs in $N_i^{Att}$. From the analysis of C-2, we know that a user may only change its serving BS from a BS in $N_i^{Att}$ to another BS in $N_i^{Att}$. Therefore, the changes of ABS and CSB patterns will only affect the utilities of players in $N_i^{Att}$.

Summarizing the above arguments, we can conclude that only $U_j$ can be changed if $s_i$ is changed to $s'_i$, where j⊂$N_i^{Att}$.

The statement that $N_i$=$N_i^{Att}$ given that $N_i^{IF}$=i∪N(i,1) is readily true by the definition of $N_i$.

APPENDIX C

Proof of Proposition 3

Suppose user u is located in the same hexagon as BSj. Then it is possible that user u is attached to a BS in N(i,3) because $O_u$∩N(i,3)≠∅. This means that N(i,3)∩$N_i$≠∅. Because $N_i^{Att}$∩N(i,3)=∅ and by definition $N_i^{Att}$⊆$N_i$, we conclude that $N_i^{Att}$⊂$N_i$.

APPENDIX D

Proof of Theorem 3

For brevity of presentation, let $$\rho \triangleq \frac{SINR_{u,b}^m}{\hat{\alpha}_m(b)}.$$

Also, note that $$SINR_{v,b}^j = \frac{\rho_{1,v}}{\hat{\alpha}_m(b)\rho_{2,v} + \rho_{3,v}},$$

where p1,v, p2,v, and p3,v are defined in (28). Then, (25) can be rewritten as $$w_u \ln(\log_2(1 + \hat{\alpha}_m(b) \cdot \rho) + r_u^{-b}) + \quad (39)$$

$$\sum_{v \in \mathcal{U}_{m,b}^{IF}} \left[ w_v \ln\left( \log_2\left(1 + \frac{\rho_{1,v}}{\hat{\alpha}_m(b)\rho_{2,v} + \rho_{3,v}}\right) + r_u^{-b} \right) \right] =$$

$$C + f_1(\hat{\alpha}_m(b)) + \sum_{v \in \mathcal{U}_{m,b}^{IF}} f_{2,v}(\hat{\alpha}_m(b)),$$

$$\text{where } C \triangleq \ln\left(\frac{1}{\ln(2)}\right)\left(w_u + \sum_{v \in \mathcal{U}_{m,b}^{IF}} w_v\right) \text{ is a constant,}$$

$$f_1(\hat{\alpha}_m(b)) \triangleq w_u \ln(\ln(1 + \hat{\alpha}_m(b) \cdot \rho) + \ln(2) r_u^{-b}), \text{ and} \quad (40)$$

$$f_{2,v}(\hat{\alpha}_m(b)) \triangleq w_v \ln\left( \ln\left(1 + \frac{\rho_{1,v}}{\hat{\alpha}_m(b)\rho_{2,v} + \rho_{3,v}}\right) + \ln(2) r_v^{-b} \right). \quad (41)$$

Observe that $f_1(\hat{\alpha}_m)$ is concave because $w_u$ is non-negative, $\ln(1+\hat{\alpha}_m(b)\cdot\rho)+\ln(2)r_u^{-b}$ is concave and $\ln(\cdot)$ is a non-decreasing concave function [24, pp. 84].

Next, we argue that $f_{2,v}(\hat{\alpha}_m(b))$ is concave. The second derivative of $f_{2,v}(\hat{\alpha}_m(b))$ w.r.t. $\hat{\alpha}_m(b)$ is given in (38), where $\mu_u = 2\ln(2)\rho_{2,v}r_v^{-b}\hat{\alpha}_m(b) + (2\ln(2)\rho_{3,v} + \ln(2)\rho_{1,v})r_v^{-b} \geq 0$.

We now argue that $f_{2,v}''(\hat{\alpha}_m(b)) > 0$. Let $$q_v \triangleq \frac{\rho_{1,v}}{\rho_{2,v}\hat{\alpha}_m(b) + \rho_{3,v}},$$

where $q_v > 0$ by definition. Then, $$\rho_{1,v}\left[\left(\frac{2\rho_{2,v}\hat{\alpha}_m(b) + 2\rho_{3,v}}{\rho_{1,v}} + 1\right)\ln\left(1 + \frac{\rho_{1,v}}{\rho_{2,v}\hat{\alpha}_m(b) + \rho_{3,v}}\right) - 1\right] = \quad (42)$$

$$\rho_{1,v}\frac{(2+q_v)\ln(1+q_v) - q_v}{q_v} > \rho_{1,v}\frac{(1+q_v)\ln(1+q_v) - q_v}{q_v},$$

where (42) is true because $\ln(1+q_v) > 0$. Then, notice that (42) is positive because $p_{1,v} > 0$ by definition and $(1+q_v)\ln(1+q_v) - q_v > 0$ for $q_v > 0$ for the following reasons:

1) $\lim_{q_v \to 0^+}(1+q_v)\ln(1+q_v) - q_v = 0$.

2) The derivative of $(1+q_v)\ln(1+q_v) - q_v$ w.r.t $q_v$ is $\ln(1+q_v)$ which is larger than zero for $q_v > 0$, meaning that $(1+q_v)\ln(1+q_v) - q_v$ is an increasing function of $q_v$ when $q_v > 0$.

Therefore, $f_{2,v}''(\hat{\alpha}_m(b)) > 0$ because (42) is positive and the terms p1,v, p2,v, p3,v, and $w_v$ are all positive. The fact that $f_{2,v}''(\hat{\alpha}_m((b)) > 0$ implies that $f_{2,v}(\hat{\alpha}_m(b))$ is convex (The domain of $f_{2,v}(\hat{\alpha}_m(b))$ is clearly convex) [24].

From (39), (40), and (41), the objective function of POWERALLOCATION can be rewritten as $$C + \sum_{v \in \mathcal{U}_{m,b}^{IF}} f_{2,v}(\hat{\alpha}_m(b)) - (-f_1(\hat{\alpha}_m(b))), \quad (43)$$

$$f_{2,v}''(\hat{\alpha}_m(b)) = \frac{\rho_{1,v}\rho_{2,v}^2 w_v \left\{ \rho_{1,v}\left[ \frac{\left(\frac{2\rho_{2,v}\hat{\alpha}_m(b) + 2\rho_{3,v}}{\rho_{1,v}} + 1\right)}{\ln\left(1 + \frac{\rho_{1,v}}{\rho_{2,v}\hat{\alpha}_m(b) + \rho_{3,v}}\right) - 1} \right] + \mu_v \right\}}{(\rho_{2,v}\hat{\alpha}_m(b) + \rho_{3,v})^2 (\rho_{2,v}\hat{\alpha}_m(b) + \rho_{3,v} + \rho_{1,v})^2 \left(\ln\left(1 + \frac{\rho_{1,v}}{\rho_{2,v}\hat{\alpha}_m(b) + \rho_{3,v}}\right) + \ln(2)r_v^{-b}\right)^2} \quad (38)$$

where the first term is a constant, the second term is a summation of convex functions, and the third term $-f_1(\hat{\alpha}_m(b))$ is also convex because $-f_1(\hat{\alpha}_m(b))$ is concave. Therefore, the objective function of POWERALLOCATION is a difference between two convex functions

REFERENCES

[1] Cisco, "Cisco visual networking index: Forecast and methodology, 2013-2018," June 2014.

[2] H. Dhillon, R. Ganti, F. Baccelli, and J. Andrews, "Modeling and analysis of k-tier downlink heterogeneous cellular networks," *IEEE Journal on Selected Areas in Communications*, vol. 30, no. 3, pp. 550-560, April 2012.

[3] J. Andrews, S. Buzzi, W. Choi, S. Hanly, A. Lozano, A. Soong, and J. Zhang, "What will 5G be?" *IEEE Journal on Selected Areas in Communications*, vol. 32, no. 6, pp. 1065-1082, June 2014.

[4] J. Andrews, "Seven ways that HetNets are a cellular paradigm shift," *IEEE Communications Magazine*, vol. 51, no. 3, pp. 136-144, March 2013.

[5] A. Tall, Z. Altman, and E. Altman, "Self organizing strategies for enhanced ICIC (eICIC)," *CoRR*, vol. abs/1401.2369, 2014. [Online]. Available: http://arxiv.org/abs/1401.2369

[6] S. Deb, P. Monogioudis, J. Miernik, and J. Seymour, "Algorithms for enhanced inter-cell interference coordination (eICIC) in LTE HetNets," *IEEE/ACM Transactions on Networking*, vol. 22, no. 1, pp. 137-150, February 2014.

[7] J. Pang, J. Wang, D. Wang, G. Shen, Q. Jiang, and J. Liu, "Optimized time-domain resource partitioning for enhanced inter-cell interference coordination in heterogeneous networks," in *Proc. IEEE Wireless Communications and Networking Conference (WCNC)*, April 2012, pp. 1613-1617.

[8] R. Thakur, A. Sengupta, and C. Siva Ram Murthy, "Improving capacity and energy efficiency of femtocell based cellular network through cell biasing," in *Proc. 11th International Symposium on Modeling Optimization in Mobile, Ad Hoc Wireless Networks (WiOpt)*, May 2013, pp. 436-443.

[9] A. Bedekar and R. Agrawal, "Optimal muting and load balancing for eICIC," in *Proc. 11th International Symposium on Modeling Optimization in Mobile, Ad Hoc Wireless Networks (WiOpt)*, May 2013, pp. 280-287.

[10] M. Simsek, M. Bennis, and I. Güvenc, "Enhanced intercell interference coordination in HetNets: Single vs. multiflow approach," in *Proc. IEEE Globecom Workshops (GC Wkshps)*, December 2013, pp. 725-729.

[11] ——, "Learning based frequency- and time-domain inter-cell interference coordination in HetNets," *CoRR*, vol. abs/1411.5548, 2014. [Online]. Available: http://arxiv.org/abs/1411.5548

[12] A. Liu, V. K. N. Lau, L. Ruan, J. Chen, and D. Xiao, "Hierarchical radio resource optimization for heterogeneous networks with enhanced intercell interference coordination (eICIC)," *IEEE Transactions on Signal Processing*, vol. 62, no. 7, pp. 1684-1693, April 2014.
[13] N. Trabelsi, L. Roullet, and A. Feki, "A generic framework for dynamic eICIC optimization in LTE heterogeneous networks," in *Proc. IEEE 80th Vehicular Technology Conference (VTC Fall)*, September 2014.
[14] Y. Liu, C. S. Chen, and C. W. Sung, "Distributed enhanced inter-cell interference coordination (eICIC) in LTE-Advanced HetNets: A potential game approach," in *Proc. IEEE 81st Vehicular Technology Conference (VTC Spring)*, May 2015, pp. 1-5.
[15]—, "Joint optimization on inter-cell interference management and user attachment in LTE-A HetNets," in *Proc. 13th International Symposium on Modeling and Optimization in Mobile, Ad Hoc, and Wireless Networks (WiOpt)*, May 2015, pp. 62-69.
[16] A. Merwaday, S. Mukherjee, and I. Güvenc "Capacity analysis of LTEAdvanced HetNets with reduced power subframes and range expansion," *EURASIP Journal on Wireless Communications and Networking*, vol. 2014, 110. 1, pp. 1-19,2014.
[17] J. Wang and T. Ng, *Advances in 3G Enhanced Technologies for Wireless Communications*, ser. Artech House mobile communications series. Artech House, 2002.
[18] C. W. Sung, K. Shum, and C. Y. Ng, "Fair resource allocation for the Gaussian broadcast channel with ISI," *IEEE Transactions on Communications*, vol. 57, no. 5, pp. 1381-1389, May 2009.
[19] C. Singh and C. S. Chen, "Distributed downlink resource allocation in cellular networks through spatial adaptive play," in *Proc. 25th International Teletraffic Congress (ITC)*, 2013.
[20] A. B. MacKenzie and L. A. DaSilva, *Game Theory for Wireless Engineers*. Morgan & Claypool, 2006.
[21] T. Lipp and S. Boyd, "Variations and extension of the convexconcave procedure," *Optimization and Engineering*, pp. 1-25, 2015.
[22] S. Sesia, I. Toufik, and M. Baker, *LTE—The UMTS Long Term Evolution: From Theory to Practice*. Wiley, 2011.
[23] G. Caire, R. Muller, and R. Knopp, "Hard fairness versus proportional fairness in wireless communications: The single-cell case," *IEEE Transactions on Information Theory*, vol. 53, no. 4, pp. 1366-1385, April 2007.
[24] S. Boyd and L. Vandenberghe, *Convex Optimization*. New York, N.Y., USA: Cambridge University Press, 2004.
[25] D. Gale, *The Theory of Linear Economic Models*. University of Chicago Press, 1960.
[26] J. Reijnierse and J. Potters, "On finding an envy-free pareto-optimal division," *Mathematical Programming*, vol. 83, no. 1-3, pp. 291-311, 1998.
[27] GreenTouch, "Mobile communications WG architecture doc2: Reference scenarios," May 2013.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:
1. A method of optimising a network, comprising:
selecting an operating characteristic of a network to optimise;
determining at least one operating parameter of network nodes within said network which affects said operating characteristic;
selecting an optimisable network node from within said network;
identifying a cluster of said network nodes whose operating characteristic is affected by a change in said at least one operating parameter of said optimisable network node;
iteratively adjusting said at least one operating parameter of said optimisable network node;

determining said operating characteristic of said cluster of said network nodes in response to that adjusted at least one operating parameter of said optimisable network node; and selecting that adjusted at least one operating parameter of said optimisable network node which improves said operating characteristic of said cluster of said network nodes.

2. The method of claim 1, wherein said selecting comprises iteratively selecting an optimisable network node from within said network and performing the steps of identifying a cluster, iteratively adjusting and selecting that adjusted at least one operating parameter for each optimisable network node.

3. The method of claim 1, wherein each optimisable network node is selected randomly from said network nodes, wherein said operating characteristic is based on inter-cell interference, wherein said operating characteristic comprises user traffic throughput, wherein said cluster comprises network nodes whose inter-cell interference is affected by a change in said at least one operating parameter of said optimisable network node.

4. The method of claim 1, wherein said cluster comprises said optimisable network node and its neighbouring network nodes, wherein said cluster comprises said optimisable network node and those neighbouring network nodes which provide for convergence of said operating parameter, wherein said cluster comprises said optimisable network node and its first-order neighbouring network nodes.

5. The method of claim 1, wherein said operating parameter comprises at least one of an almost bank subframe pattern, a cell selection bias and an almost bank subframe reduced power, wherein said operating parameter comprises at least one of an almost bank subframe pattern, a cell selection bias and an almost bank subframe reduced power in relation to small cells located within a cell provided said optimisable network node, wherein said operating parameter comprises at least one of an almost bank subframe pattern, a cell selection bias and an almost bank subframe reduced power in relation to a selected small cell base station located within a cell provided said optimisable network node.

6. The method of claim 1, wherein said determining said operating characteristic of said cluster of said network nodes comprises performing scheduling based on that adjusted at least one operating parameter of said optimisable network node to determine said operating characteristic of said cluster of said network nodes with that adjusted at least one operating parameter, wherein said scheduling allocates network node resources to users using one of a round-robin, a PF, a convex and a cake-cutting basis, wherein said scheduling allocates network node resources to users using a quantisation process whereby iteratively, for each resource, that user which is most-allocated that resource is allocated that resource until all users are allocated at least one resource.

7. The method of claim 1, wherein said selecting comprises selecting that adjusted at least one operating parameter of said optimisable network node which most improves said operating characteristic of said cluster of said network.

8. The method of claim 1, comprising ceasing iteratively selecting an optimisable network node from within said network when at least one of:
an operating characteristic threshold is exceeded; and
less than a threshold change in operating parameters occurs.

9. A network node, comprising:
processing logic operable to
select an operating characteristic of a network to optimise, determine at least one operating parameter of network nodes within said network which affects said operating characteristic,
select an optimisable network node from within said network, identify a cluster of said network nodes whose operating characteristic is affected by a change in said at least one operating parameter of said optimisable network node,
iteratively adjust said at least one operating parameter of said optimisable network node,
determine said operating characteristic of said cluster of said network nodes in response to that adjusted at least one operating parameter of said optimisable network node, and
select that adjusted at least one operating parameter of said optimisable network node which improves said operating characteristic of said cluster of said network nodes.

10. The network node of claim 9, wherein said processing logic is operable to iteratively select an optimisable network node from within said network and identify a cluster, iteratively adjust and select that adjusted at least one operating parameter for each optimisable network node.

11. The network node of claim 9, wherein each optimisable network node is selected randomly from said network nodes, wherein said operating characteristic is based on inter-cell interference, wherein said operating characteristic comprises user traffic throughput, wherein said cluster comprises network nodes whose inter-cell interference is affected by a change in said at least one operating parameter of said optimisable network node.

12. The network node of claim 9, wherein said cluster comprises said optimisable network node and its neighbouring network nodes, wherein said cluster comprises said optimisable network node and those neighbouring network nodes which provide for convergence of said operating parameter, wherein said cluster comprises said optimisable network node and its first-order neighbouring network nodes.

13. The network node of claim 9, wherein said operational parameter comprises at least one of an almost bank subframe pattern, a cell selection bias and an almost bank subframe reduced power, wherein said operational parameter comprises at least one of an almost bank subframe pattern, a cell selection bias and an almost bank subframe reduced power in relation to small cells located within a cell provided said optimisable network node, wherein said operational parameter comprises at least one of an almost bank subframe pattern, a cell selection bias and an almost bank subframe reduced power in relation to a selected small cell base station located within a cell provided said optimisable network node.

14. The network node of claim 9, wherein said processing logic is operable to determine said operating characteristic of said cluster of said network nodes by performing scheduling based on that adjusted at least one operating parameter of said optimisable network node to determine said operating characteristic of said cluster of said network nodes with that adjusted at least one operating parameter.

15. The network node of claim 14, wherein said scheduling allocates network node resources to users using a quantisation process whereby iteratively, for each resource, that user which is most-allocated that resource is allocated that resource until all users are allocated at least one resource.

16. The network node of claim 9, wherein processing logic is operable to perform scheduling by assuming that network nodes other than said optimisable network node within said cluster transmit with full power while adjusting said at least one parameter of said optimisable network node.

17. The network node of claim 9, wherein said processing logic is operable to select that adjusted at least one operating parameter of said optimisable network node which most improves said operating characteristic of said cluster of said network.

18. The network node of claim 9, wherein said processing logic is operable to cease iteratively selecting an optimisable network node from within said network when at least one of: an operating characteristic threshold is exceeded; and less than a threshold change in operating parameters occurs.

19. A non-transitory computer readable storage medium comprised of instructions executable by a machine for performing operations, the operations comprising:

selecting an operating characteristic of a network to optimise;

determining at least one operating parameter of network nodes within said network which affects said operating characteristic;

selecting an optimisable network node from within said network;

identifying a cluster of said network nodes whose operating characteristic is affected by a change in said at least one operating parameter of said optimisable network node;

iteratively adjusting said at least one operating parameter of said optimisable network node;

determining said operating characteristic of said cluster of said network nodes in response to that adjusted at least one operating parameter of said optimisable network node; and selecting that adjusted at least one operating parameter of said optimisable network node which improves said operating characteristic of said cluster of said network nodes.

* * * * *